United States Patent [19]
Yamamoto et al.

[11] Patent Number: 6,002,435
[45] Date of Patent: Dec. 14, 1999

[54] SOLID-STATE IMAGING APPARATUS

[75] Inventors: Hiroo Yamamoto; Seiichiro Mizuno, both of Hamamatsu, Japan

[73] Assignee: Hamamatsu Photonics K.K., Hamamatsu, Japan

[21] Appl. No.: 08/831,713

[22] Filed: Apr. 1, 1997

[30] Foreign Application Priority Data

Apr. 1, 1996 [JP] Japan ................................... 8-079087

[51] Int. Cl.$^6$ .................................................. H04N 3/14
[52] U.S. Cl. ........................................... 348/307; 348/308
[58] Field of Search ................................... 348/241, 242, 348/248, 307, 308, 243; 358/463

[56] References Cited

U.S. PATENT DOCUMENTS

| | | | |
|---|---|---|---|
| 4,953,028 | 8/1990 | Murayama et al. | 348/308 |
| 4,974,093 | 11/1990 | Murayama et al. | 348/308 |
| 5,311,320 | 5/1994 | Hashimoto | 348/243 |
| 5,731,578 | 3/1998 | Mizuno | 348/308 |
| 5,798,423 | 8/1998 | Hamasaki | 348/308 |

OTHER PUBLICATIONS

Ricquier et al: "The CIVIS Sensor: A Flexible Smart Imager with Programmable Resolution", SPIE vol. 2172, pp. 2–10.

*Primary Examiner*—Wendy Garber
*Assistant Examiner*—Luong Nguyen
*Attorney, Agent, or Firm*—Pillsbury Madison & Sutro LLP

[57] ABSTRACT

In the solid-state imaging apparatus of the present invention, when a signal is output from the capacity element to the data signal output circuit, the voltage of the output terminal of the capacity element is kept at that attained when the switch was previously opened, namely, the initial voltage of the input terminal of the data signal output circuit, whereby the voltage of the input terminal of the data signal output circuit is stable without fluctuation. Therefore, no noise is generated in the output signal at the instant when the capacity element and data signal output circuit are short-circuited, whereby optical images can be captured with a high accuracy in a high speed.

20 Claims, 7 Drawing Sheets

SOLID-STATE IMAGING APPARATUS

BACKGROUND OF THE INVENTION

1. Field of the Invention

The present invention relates to a solid-state imaging apparatus for capturing a one-dimensional optical image input from the outside and a solid-state imaging apparatus for capturing a two-dimensional optical image input from the outside.

2. Related Background Art

Imaging apparatuses such as CCD (Charge Coupled Device) and BBD (Bucket Bridge Device) have been used in various fields such as home video. When electric charges of a photodiode which has a relatively large photosensitive area are handled by a CCD whose charge transfer efficiency is so low that the maximum signal charge amount has to be made small, however, such charges may not completely be transferred therefrom.

Accordingly, among solid-state imaging apparatuses, MOS type image sensors which are not problematic in terms of charge transfer efficiency are used in specific fields. There have been proposals for improving the charge driving speed of the conventional MOS type image sensors, which has been lower than that of CCD. A typical example thereof (simply referred to as "conventional example" hereinafter) is disclosed in N. Ricquier et al., *SPIE*, Vol. 2172, pp. 2–10.

The MOS type image sensor of the conventional example comprises (a) an area type photosensitive section in which, while M sets of photosensitive pixels each comprising a photodiode for converting an input light signal into a current signal and a switch having a first terminal connected to a signal output terminal of the photodiode and a second terminal for outputting, in response to a vertical scanning signal, the current signal generated at the photodiode are arranged along a first direction (referred to as "vertical direction" hereinafter), N pieces of vertical photosensitive sections each having a signal output terminal electrically connected to the second terminals of the respective switches are arranged along a second direction (referred to as "horizontal direction" hereinafter). Also, this apparatus comprises (b) N pieces of integrating circuits which respectively input the outputs from the N pieces of vertical photosensitive sections and each subject, in response to a reset instruction signal, the current signal output from the vertical photosensitive section to an integrating or non-integrating operation with respect to a capacity element connected between their input and output terminals; (c) N pieces of capacity elements each of which inputs the signal output from the corresponding integrating circuit and outputs an AC component; and (d) N pieces of switches respectively input signals output from the capacity elements and output the signal from a designated capacity element.

This apparatus further comprises (e) a data signal output circuit which selectively inputs, in response to N kinds of horizontal scanning signals, the signals output from the respective capacity elements and outputs an output data signal, while setting, according to an initial voltage setting instruction signal, its input voltage level and output voltage level to a reference voltage, which is their initial level, for a logical true period; and (f) a timing control section for outputting the initial voltage instruction signal, reset instruction signal, N kinds of vertical scanning signals, and N kinds of horizontal scanning signals.

In this apparatus, a light image formed by light input into the area type photosensitive section is captured as follows.

First, prior to the execution of a readout operation, the timing control section sets the integrating circuit reset instruction signal to a logical true level, thereby setting the output of the integrating circuit to the reference voltage which is its initial level. Also, before the readout operation is executed, the initial voltage setting instruction signal is set to a logical true level. As a result, the input and output terminals of the data output circuit are set to the reference voltage which is their initial voltage.

Subsequently, the timing control section sets the integrating circuit reset instruction signal and the initial voltage setting instruction signal to logical false levels, and then outputs, as a logical true signal, a vertical scanning signal which turns on only the switch of the first photosensitive pixel in the vertical scanning operation of each vertical photosensitive section. When this switch is turned on, the charge which has been accumulated in the photodiode due to the light received so far is output as a current signal from the photosensitive section. Then, the current signal is instantly accumulated by the integrating circuit into its feedback capacity element and output therefrom as a voltage signal. The signal output from the integrating circuit is input into the capacity element. As a result, the signal input terminal and signal output terminal of the capacity element have a voltage corresponding to the amount of light received in the photosensitive element.

Then, a horizontal scanning signal is set so as to start a readout operation for data concerning the first photosensitive pixel in the vertical direction. The timing control section sets a horizontal scanning signal which instructs only the switch corresponding to the first vertical photosensitive section in the horizontal direction to be selected to a logical true level, thereby turning on only the switch corresponding to the first vertical photosensitive section.

The signal transmitted through this switch is input into the data output circuit and then is output therefrom as an output data signal corresponding to the light amount incident on the first vertical photosensitive section in the horizontal direction. Subsequently, the horizontal scanning signal which instructs only the switch corresponding to the first vertical photosensitive section in the horizontal direction to be selected is set to a logical false level, whereby the data readout operation concerning the first vertical photosensitive section in the horizontal direction is terminated.

Then, as with the first vertical photosensitive section in the horizontal direction, data readout operations for the second and later vertical photosensitive sections are executed. Subsequently, as with the first photosensitive pixel in the vertical scanning operation of each vertical photosensitive section, data readout operations for the second and later vertical photosensitive pixels are executed while, for each time, the timing control section sets the integrating circuit reset instruction signal and initial voltage setting instruction signal to logical true levels so as to set the output of the integrating circuit to its initial level.

SUMMARY OF THE INVENTION

The inventors have found out that, in the horizontal readout operation in a solid-state imaging device, when the voltages of one terminal and the other terminal are made to coincide with each other in a switch connected between a line type photosensitive section and a data output circuit before the switch is turned on, the voltage of the other terminal of the switching terminal, i.e., input terminal of the data output circuit, is also prevented from becoming unstable at the instant when the switch is turned on, whereby the output of the data output circuit is made stable, improving the final imaging accuracy of the apparatus.

Therefore, it is an object of the present invention to provide, based on improvement in S/N, a solid-state imaging apparatus in which images can be captured with a high accuracy in a high speed.

In order to attain the above-mentioned object, the present invention provides a solid-state imaging apparatus for capturing a one-dimensional optical image input from the outside, comprising: (1) a line type photosensitive section comprising a plurality of photosensitive pixels, the photosensitive pixels being arranged along a predetermined direction, each of the photosensitive pixel converting an input light signal into a current signal and outputting the current signal; (2) integrating circuits arranged for the photosensitive pixels respectively, each of the integrating circuits selectively performing an integrating operation for the current signal output from the corresponding photosensitive pixel and an initial voltage level setting operation for an output signal; (3) clamping circuits arranged for the integrating circuit respectively, each of the clamping circuits selectively performing a clamping processing for a signal output from the corresponding integrating circuit and an initial voltage level setting operation for an output signal; (4) sample-and-hold circuits arranged for the clamping circuits respectively, each of the sample-and-hold circuits selectively performing a sampling and holding operation for a signal output from the corresponding clamping circuit; (5) first capacity elements arranged for the sample-and-hold circuits respectively, each of the first capacity elements outputting an AC component based on a signal output from the corresponding sample-and-hold circuit; (6) first switches arranged for the first capacity elements respectively, each of the first switches controlling an output of the first capacity element; (7) a data signal output circuit for performing an output operation of an output data signal based on a signal input from one of the first switches and setting an initial-voltage setting operation for an input terminal selectively; and (8) a timing control section for controlling operation timings of the plurality of photosensitive pixels, the integrating circuits, the clamping circuits, the sample-and-hold circuits, the first switches, and the data signal output circuit.

This timing control section instructs: the integrating circuits and the clamping circuits to perform the initial voltage level setting operation about the output terminals of the integrating circuits before the current signals are read out from the plurality of photosensitive pixels; the first switches and the data signal output circuit to perform the initial voltage level setting operation about the output terminals of the first capacity elements and the input terminals of the data signal output circuit over a period extending from a time before the current signals are read out from the plurality of photosensitive pixels till a time at which the signal is being read out; the integrating circuits to perform the integrating operation; the clamping circuits to perform the clamping operation; the sample-and-hold circuits to perform the sampling operation during a period in which the current signal is being read out from the plurality of photosensitive pixels; and the clamping circuits to perform the initial voltage level setting operation, the sample-and-hold circuits to perform the sampling operation, the first capacity element to perform the output processing, and the data signal output circuit to perform the output processing during a period in which a signal is read out from the first capacity element after the current signals are read out from the plurality of photosensitive pixels.

Here, preferably, in the solid-state imaging apparatus of the present invention, the data signal output circuit comprises: an amplifier for amplifying a signal input from the first capacity element; a second capacity element having a first terminal connected to an input terminal of the amplifier and a second terminal connected to an output terminal of the amplifier; and a second switch having a first terminal connected to an input terminal of the amplifier and a second terminal connected to an output terminal of the amplifier, the second switch performing opening and closing operations in response to an initial voltage setting instruction signal input from the timing control section.

In such a configuration, when the timing control section sets the initial voltage setting instruction signal to a logical true level, the second switches is turned on, whereby the input terminal and output terminal of the data signal output circuit are set to the same initial voltage.

Desirably, in the above-mentioned solid-state imaging apparatus, the data signal output circuit further comprises: a third switch having a first terminal connected to a first terminal of the second capacity element and a second terminal connected to a predetermined reference voltage source, the third switch performing, in response to the initial voltage setting instruction signal, opening and closing operations identical to those of the second switch; and a fourth switch having a first terminal connected to a second terminal of the second capacity element and a second terminal connected to a predetermined reference voltage source, the fourth switch performing, in response to the initial voltage setting instruction signal, opening and closing operations identical to those of the second switch and third switch.

In such a configuration, when the timing control section sets the initial voltage setting instruction signal to a logical true level, the third and fourth switches are turned on in addition to the second switch, whereby the input and output terminals of the data signal output circuit are rapidly set to the reference voltage as the same initial voltage.

Preferably, in the solid-state imaging apparatus of the present invention, each of the photosensitive pixels comprises: a photodiode for converting the input light signal into a current signal; and a second switch having a first terminal connected to an output terminal of the photodiode and a second terminal connected to the common signal line in the line type photosensitive section, the second switch performing opening and closing operations in response to one input signal among a plurality of first scanning signals output from the timing control section.

Preferably, in the solid-state imaging apparatus of the present invention, the integrating circuit comprises: an amplifier for amplifying a signal output from the corresponding photosensitive pixel; a second capacity element having a first terminal connected to an input terminal of the amplifier and a second terminal connected to an output terminal of the amplifier; and a second switch having a first terminal connected to the input terminal of the amplifier and a second terminal connected to the output terminal of the amplifier, the second switch performing opening and closing operations in response to a reset instruction signal output from the timing control section.

Preferably, in the solid-state imaging apparatus of the present invention, the clamping circuit comprises: a second capacity element having an input terminal connected to an output terminal of the corresponding integrating circuit; an amplifier having an input terminal connected to an output terminal of the second capacity element, the amplifier amplifying a signal input from the second capacity element; a third capacity element having a first terminal connected to an input terminal of the amplifier and a second terminal connected to an output terminal of the amplifier; and a second switch having a first terminal connected to the input terminal of the amplifier and a second terminal connected to the output terminal of the amplifier, the second switch performing opening and closing operations in response to a clamp instruction signal input from the timing control section.

Preferably, in the solid-state imaging apparatus of the present invention, the sample-and-hold circuit comprises: a second switch having a first terminal connected to an output terminal of the corresponding clamping circuit, the second switch performing opening and closing operations in response to a sample instruction signal input from the timing control section; a second capacity element having a first terminal connected to a second terminal of the second switch and a second terminal connected to a predetermined voltage source; and a buffer amplifier having an input terminal connected to the second terminal of the second switch, the buffer amplifier subjecting a signal output from the second switch to an impedance conversion.

Preferably, in the solid-state imaging apparatus of the present invention, the first capacity element has an input terminal connected to an output terminal of the corresponding sample-and-hold circuit and an input terminal of the switch, and the first switch has an output terminal connected to the input terminal of the data signal output circuit, and performs opening and closing operations in response to a scanning signal input from the timing control section.

Preferably, in the solid-state imaging apparatus of the present invention, the timing control section outputs: a read out signal for instructing the plurality of photosensitive pixels to output the current signals; a reset instruction signal for instructing the integrating circuit to selectively perform the integrating processing and the initial voltage level setting operation; a clamp instruction signal for instructing the clamping circuit to selectively perform the clamping processing and the initial voltage level setting operation; a sample instruction signal for instructing the sample-and-hold circuit to selectively perform the sampling and holding operations; a scanning signal for instructing the first switch to selectively control the output of the first capacity element and set the initial voltage of the first capacity element; and an initial voltage setting instruction signal for instructing the data signal output circuit to selectively perform the output processing and the initial voltage setting operation.

Desirably, in the solid-state imaging apparatus of the present invention, the timing control section sets: the reset instruction signal and clamp instruction signal to logical true levels before the read out signal is set to a logical true level; the scanning signal and initial voltage level setting instruction signal to logical true levels during a period extending from a time the read out signal is set to a logical true level till a time at which the signal is at the logical true level; the sample instruction signal to a logical true level while the reset instruction signal is kept at a logical false level during a period in which the read out signal is at the logical true level; and the clamp instruction signal and sample instruction signal to logical true levels during a period in which the scanning signal is set to the logical true level again after the read out signal is reset to the logical false level again.

In the solid-state imaging apparatus of the present invention thus configured, a light image formed by light incident thereon from the outside is input into the line type photosensitive section, whereby electric charges are accumulated in the respective photodiodes of a plurality of photosensitive pixels in response to the received light intensities. Then, after a predetermined detecting period, the respective amounts of charges accumulated in the plurality of photosensitive pixels (photosensitive element sets) are read out as follows.

First, prior to the execution of a signal readout operation, the timing control section sets the all clamp instruction signal and the reset instruction signal (integrating circuit reset instruction signal) to logical true levels, whereby the output signals of all of the clamping circuits and all of the integrating circuits are set to their initial levels. Also, before the signal readout operation is executed, the timing control section sets the scanning signals corresponding to all the signal output lines and the initial voltage setting instruction signal to logical true levels so as to turn on all of the first switches, whereby the output terminal of each of the first capacity elements is set to the initial voltage of the data signal output circuit.

Next, the timing control section sets the all clamp instruction signal and reset instruction signal to logical false levels and, while the scanning signals corresponding to all of the signal output lines and initial voltage setting instruction signal are kept at logical true levels, sets the read out signal is turned on and the sample instruction signals corresponding to all of the signal output lines to logical true levels.

When the switches of these photosensitive pixels are turned on, the electric charges which have been accumulated in the photodiodes due to the light received thereby so far are turned into current signals so as to be output from the type photosensitive pixel. Since the current signals output from the photosensitive pixels are instantly accumulated by the integrating circuit in the capacity elements which are their feedback capacity elements, they are output from the integrating circuits as voltage signals. Each of the signals output from the integrating circuits is input into the first capacity element by way of the clamping circuit and sample-and-hold circuit corresponding to one of the plurality of signal output lines. As a result, a voltage corresponding to the light intensity received in each of the photosensitive pixels is applied to the input terminal of each of the first capacity elements.

Thereafter, the timing control section sets the scanning signal and the initial voltage setting instruction signal to logical false levels and then starts a signal readout operation concerning the first photosensitive pixel corresponding to the scanning operation. Namely, the timing control section resets the second scanning signal which instructs only the first switch corresponding to the first photosensitive pixel to be selected to the logical true level, whereby this first switch is turned on. Here, the timing control section temporarily sets the initial voltage setting instruction signal to the logical true level, whereby the voltage of the input terminal of the data signal output circuit is set to the initial voltage.

At this time, the first switching terminal corresponding to the first photosensitive pixel is turned on, whereby the output terminal of the first capacity element and the input terminal of the data signal output terminal are short-circuited. Here, the voltage of the output terminal of the first capacity element is still at that attained when the first switch was previously opened, i.e., the initial voltage of the input terminal of the data signal output circuit. Therefore, the voltage of the input terminal of the data signal output circuit remains stable without fluctuation.

Next, while the scanning signal which instructs only the first switch corresponding to the first photosensitive pixel direction to be selected is kept at the logical true level, the timing control section sets the clamp instruction signal and the sample instruction signal which respectively instruct only the clamping circuit and sample-and-hold circuit corresponding to the first photosensitive pixel to be selected to logical true levels, whereby the output signal of the clamping circuit changes to a clamping voltage. This change in output signal of the clamping circuit is output from the data signal output circuit, by way of the sample-and-hold circuit and the first capacity element, as an output data signal corresponding to the light intensity incident on the first photosensitive pixel.

Subsequently, by setting the second scanning signal, clamp instruction signal, and sample instruction signal which instruct only the first switch, clamping circuit, and sample-and-hold circuit corresponding to the first photosensitive pixel to be selected to logical false levels, the timing control section terminates a data readout operation concerning the first photosensitive pixel.

Thereafter, as with the first photosensitive pixel corresponding to the scanning operation, data readout operations concerning the second and later photosensitive pixels are executed. Namely, while the timing control section sets the input terminal of the data signal output circuit to a reference voltage each time by setting the scanning signals which instruct only the first switches corresponding to the second and later photosensitive pixels to be selected and the initial voltage instruction signal to their initial levels, the data readout operations concerning the second and later photosensitive pixel in the first photosensitive pixel are successively executed.

Also, in order to attain the above-mentioned object, the present invention provides a solid-state imaging apparatus for capturing a two-dimensional optical image input from the outside, comprising: (1) an area type photosensitive section having a first number of line type photosensitive sections arranged along a first direction and common signal lines arranged for said line type photosensitive sections, each of said line type photosensitive section having a second number of photosensitive pixels arranged along a second direction, each of said photosensitive pixels converting an input light signal into a current signal, each of said photosensitive pixel in said line type photosensitive section outputting the current signal to the corresponding common signal line; (2) integrating circuits arranged for said line type photosensitive sections respectively, each of said integrating circuits selectively performing an integrating operation for a signal output from the corresponding line type photosensitive section and an initial voltage level setting operation for an output signal; (3) clamping circuits arranged for said integrating circuits respectively, each of said clamping circuits selectively performing a clamping processing for a signal output from the corresponding integrating circuit and an initial voltage level setting operation for an output signal; (4) sample-and-hold circuits arranged for said clamping circuits respectively, each of sample-and-hold circuits selectively performing sampling and holding operations for a signal output from the corresponding clamping circuit; (5) first capacity elements arranged for said sample-and-hold circuits respectively, each of first capacity elements performing an output processing of an AC component based on a signal output from the corresponding sample-and-hold circuit; (6) first switches arranged for said first capacity elements respectivly, each of said switches controlling an output of the corresponding first capacity element; (7) a data signal output circuit for selectively performing an output processing of respective output data signal based on a signal output from one of said first switches and an initial-voltage setting operation for an input terminal; and (8) a timing control section for controlling operation timings of said photosensitive pixels, said integrating circuits, said clamping circuits, said sample-and-hold circuits, said first switches, and said data signal output circuit.

This timing control section section instructs: the integrating circuits and clamping circuits to perform the initial voltage level setting operation before a signal is read out from one photosensitive pixel selected from the photosensitive pixels in each of the line type photosensitive sections; the first switches and the data signal output circuit to perform the initial voltage setting operation about the output terminals of the first capacity elements and the input terminal of the data signal output circuit over a period extending from a time before the signal is read out from one photosensitive pixel selected from the photosensitive pixels in each of the line type photosensitive sections till a time at which the signal is being read out; the integrating circuits to perform the integrating operation; the clamping circuits to perform the clamping operation; the sample-and-hold circuits to perform the sampling operation during a period in which the signal is being read out from one photosensitive pixel selected from the photosensitive pixels in each of the line type photosensitive sections; the data signal output circuit to perform the initial voltage setting operation about the input terminal of the data signal output circuit during a period in which a signal is being read out from one of the first capacity elements corresponding to one line type photosensitive section selected from the line type photosensitive sections after the signal is read out from one photosensitive pixel selected from the line type photosensitive pixels in each of the line type photosensitive sections; one the clamping circuits corresponding to one line type photosensitive section selected from the line type photosensitive sections to perform the initial voltage level setting operation; one of the sample-and-hold circuits corresponding to one line type photosensitive section selected from the line type photosensitive sections to perform the sampling operation; one of the first capacity elements corresponding to one line type photosensitive section selected from the line type receiving sections to perform the output processing; and the data signal output circuit to perform the output processing.

Here, preferably, in the solid-state imaging apparatus of the present invention, the data signal output circuit comprises: an amplifier for amplifying each signal input from the plurality of first capacity elements; a second capacity element having a first terminal connected to an input terminal of the amplifier and a second terminal connected to an output terminal of the amplifier; and a second switch having a first terminal connected to the input terminal of the amplifier and a second terminal connected to the output terminal of the amplifier, the second switch performing opening and closing operations in response to an initial voltage setting instruction signal input from the timing control section.

In such a configuration, when the timing control section sets the initial voltage setting instruction signal to a logical true level, the second switch is turned on, whereby the input terminal and output terminal of the data signal output circuit are set to the same initial voltage.

Desirably, in the above-mentioned solid-state imaging apparatus, the data signal output circuit further comprises: a third switch having a first terminal connected to a first terminal of the second capacity element and a second terminal connected to a predetermined reference voltage source, the third switch performing, in response to the initial voltage setting instruction signal, opening and closing operations identical to those of the second switch; and a fourth switch having a first terminal connected to a second terminal of the second capacity element and a second terminal connected to a predetermined reference voltage source, the forth switch performing, in response to the initial voltage setting instruction signal, opening and closing operations identical to those of the second switch and third switch.

In such a configuration, when the timing control section sets the initial voltage setting instruction signal to a logical true level, the third and fourth switches are turned on in addition to the second switch, whereby the input and output terminals of the data signal output circuit are rapidly set to the reference voltage as the same initial voltage.

Preferably, in the solid-state imaging apparatus of the present invention, each of the photosensitive pixels comprises: a photodiode for converting the input light signal into a current signal; and a second switch having a first terminal connected to an output terminal of the photodiode and a second terminal connected to one of a plurality of common signal lines in the plurality of line type photosensitive sections, the second switch performing opening and closing operations in response to one input signal among a plurality of first scanning signals output from the timing control section.

Preferably, in the solid-state imaging apparatus of the present invention, each of the integrating circuits comprises: an amplifier for amplifying a signal output from the corresponding line type photosensitive section; a second capacity element having a first terminal connected to an input terminal of the amplifier and a second terminal connected to an output terminal of the amplifier; and a second switch having a first terminal connected to the input terminal of the amplifier and a second terminal connected to the output terminal of the amplifier, the second switch performing opening and closing operations in response to a reset instruction signal output from the timing control section.

Preferably, in the solid-state imaging apparatus of the present invention, each of the clamping circuits comprises: a second capacity element having an input terminal connected to an output terminal of the corresponding integrating circuit; an amplifier having an input terminal connected to an output terminal of the second capacity element and amplifies a signal output from the second capacity element; a third capacity element having a first terminal connected to the input terminal of the amplifier and a second terminal connected to an output terminal of the amplifier; and a second switch having a first terminal connected to the input terminal of the amplifier and a second terminal connected to the output terminal of the amplifier, the second switch performing opening and closing operations in response to one input clamp instruction signal among a clamp instruction signals output from the timing control section.

Preferably, in the solid-state imaging apparatus of the present invention, each of the sample-and-hold circuits comprises: a second switch having a first terminal connected to an output terminal of the corresponding clamping circuit, the second switching opening and closing operations in response to one input sample instruction signal among a plurality of sample instruction signals output from the timing control section; a second capacity element having a first terminal connected to a second terminal of the second switch and a second terminal connected to a predetermined voltage source; and a buffer amplifier having an input terminal connected to the second terminal of the second switch, the buffer amplifier subjecting a signal input from said second switch to an impedance conversion.

Preferably, in the solid-state imaging apparatus of the present invention, each of the first capacity elements has an input terminal connected to an output terminal of the corresponding sample-and-hold circuit and an output terminal connected to an input terminal of the corresponding switch, and each of the first switches has an output terminal connected to the input terminal of the data signal output circuit, the first switch performing opening and closing operations in response to one input signal among a plurality of second scanning signals output from the timing control section.

Preferably, in the solid-state imaging apparatus of the present invention, the timing control section outputs: first scanning signals for individually instructing said photosensitive pixels to perform the output processing which is common among said line type photosensitive sections; a reset instruction signal for instructing said integrating circuits to selectively perform the integrating processing and the initial voltage level setting operation; a plurality of clamp instruction signals for individually instructing said clamping circuits to selectively perform the clamping processing and the initial voltage level setting operation; sample instruction signals for individually instructing said sample-and-hold circuits to selectively perform sampling and holding operations; second scanning signals for individually instructing said first switches to selectively control the outputs of said first capacity elements and set the initial voltage level of first capacity elements, and an initial voltage setting instruction signal for instructing said data signal output circuit to selectively perform the output operation and the initial voltage setting operation.

Desirably, in the solid-state imaging apparatus of the present invention, the timing control section computes: a logical sum of an all line selecting instruction signal for setting all of the line type photosensitive sections to objects to be selected and a plurality of individual line selection instruction signals for respectively setting the line type photosensitive sections to objects to be selected, so as to generate the plurality of second scanning signals; a logical sum of a result obtained when a logical product of individual clamp instruction signals for respectively setting the clamping circuits to objects to be selected and the second scanning signals is computed and an all clamp instruction signal for setting all of the clamping circuits to objects to be selected, so as to generate the clamp instruction signals; and a logical sum of a result obtained when a logical product of individual sample instruction signals for respectively setting the sample-and-hold circuits to objects to be selected and the second scanning signals is computed and an all sample instruction signal for setting all of the sample-and-hold circuits to objects to be selected, so as to generate the sample instruction signals.

Desirably, in the solid-state imaging apparatus of the present invention, the timing control section sets: the reset instruction signal and all of the clamp instruction signals to logical true levels before one signal selected from the first scanning signals is set to a logical true level; all of the second scanning signals and the initial potential setting instruction signal to logical true levels during a period extending from a time before one signal selected from the first scanning signals is set to a logical true level till a time at which the signal is at the logical true level; all of the sample instruction signals to logical true levels while the reset instruction signal is kept at a logical false level during a period in which one signal selected from the first scanning signals is at the logical true level; the initial potential setting instruction signal to a logical true level during a period in which one of the second scanning signals is reset to the logical true level after one signal selected from the first scanning signals is reset to the logical false level; and one of the clamp instruction signals corresponding to one signal selected from the second scanning signals and one of the sample instruction signals corresponding to one signal selected from the second scanning signs to logical true levels.

In the solid-state imaging apparatus of the present invention thus configured, a light image formed by light incident thereon from the outside is input into the area type photosensitive section, whereby electric charges are accumulated in the respective photodiodes of a plurality of photosensitive pixels contained in each of the plurality of line type photosensitive sections (vertical photosensitive sections) in response to the received light intensities. Then, after a predetermined detecting period, the respective amounts of charges accumulated in the plurality of photosensitive pixels (photosensitive element sets) are read out as follows.

First, prior to the execution of a signal readout operation, the timing control section sets the all clamp instruction signal and the reset instruction signal (integrating circuit reset instruction signal) to logical true levels, whereby the output signals of all of the plurality of clamping circuits and all of the plurality of integrating circuits are set to their initial levels. Also, before the signal readout operation is executed, the timing control section sets the plurality of second scanning signals (horizontal scanning signals) corresponding to all the signal output lines and the initial voltage setting instruction signal to logical true levels so as to turn on all of the first switches, whereby the output terminal of each of the first capacity elements is set to the initial voltage of the data signal output circuit.

Next, the timing control section sets the all clamp instruction signal and reset instruction signal to logical false levels and, while the plurality of second scanning signals corresponding to all of the signal output lines and initial voltage setting instruction signal are kept at logical true levels, sets a plurality of first scanning signals (vertical scanning signals) by which only the switches of the first photosensitive pixels corresponding to all the first scanning operations (vertical scanning operations) of the plurality of line type photosensitive sections are turned on and the plurality of sample instruction signals corresponding to all of the signal output lines to logical true levels.

When the switches of these photosensitive pixels are turned on, the electric charges which have been accumulated in the photodiodes due to the light received thereby so far are turned into current signals so as to be output from the plurality of line type photosensitive sections. Since the current signals output from the plurality of line type photosensitive sections are instantly accumulated by the plurality of integrating circuit in the capacity elements which are their feedback capacity elements, they are output from the plurality of integrating circuits as voltage signals. Each of the signals output from the plurality of integrating circuits is input into the first capacity element by way of the clamping circuit and sample-and-hold circuit corresponding to one of the plurality of signal output lines. As a result, a voltage corresponding to the light intensity received in the first photosensitive pixel of each of the plurality of line type photosensitive elements is applied to the input terminal of each of the plurality of first capacity elements.

Thereafter, the timing control section sets the second scanning signal and the initial voltage setting instruction signal to logical false levels and then starts a signal readout operation concerning the first photosensitive pixel corresponding to the second scanning operation (horizontal scanning operation). Namely, the timing control section resets the second scanning signal which instructs only the first switch corresponding to the first photosensitive pixel in the horizontal direction to be selected to the logical true level, whereby this first switch is turned on. Here, the timing control section temporarily sets the initial voltage setting instruction signal to the logical true level, whereby the voltage of the input terminal of the data signal output circuit is set to the initial voltage.

At this time, the first switching terminal corresponding to the first photosensitive pixel in the horizontal direction is turned on, whereby the output terminal of the first capacity element and the input terminal of the data signal output terminal are short-circuited. Here, the voltage of the output terminal of the first capacity element is still at that attained when the first switch was previously opened, i.e., the initial voltage of the input terminal of the data signal output circuit. Therefore, the voltage of the input terminal of the data signal output circuit remains stable without fluctuation.

Next, while the second scanning signal which instructs only the first switch corresponding to the first photosensitive pixel in the horizontal direction to be selected is kept at the logical true level, the timing control section sets the clamp instruction signal and the sample instruction signal which respectively instruct only the clamping circuit and sample-and-hold circuit corresponding to the first photosensitive pixel in the horizontal direction to be selected to logical true levels, whereby the output signal of the clamping circuit changes to a clamping voltage. This change in output signal of the clamping circuit is output from the data signal output circuit, by way of the sample-and-hold circuit and the first capacity element, as an output data signal corresponding to the light intensity incident on the first photosensitive pixel in the horizontal direction.

Subsequently, by setting the second scanning signal, clamp instruction signal, and sample instruction signal which instruct only the first switch, clamping circuit, and sample-and-hold circuit corresponding to the first photosensitive pixel in the horizontal direction to be selected to logical false levels, the timing control section terminates a data readout operation concerning the first photosensitive pixel in the horizontal direction.

Thereafter, as with the first photosensitive pixel corresponding to the second scanning operation (horizontal scanning operation), data readout operations concerning the second and later photosensitive pixels in the horizontal direction are executed. Namely, while the timing control section sets the input terminal of the data signal output circuit to a reference voltage each time by setting the second scanning signals which instruct only the first switches corresponding to the second and later photosensitive pixels to be selected and the initial voltage instruction signal to their initial levels, the data readout operations concerning the second and later photosensitive elements in the first photosensitive pixel in the vertical direction are successively executed.

Next, as with the respective first photosensitive pixels corresponding to all the first scanning operations in the plurality of line type photosensitive sections, data readout operations for the second and later photosensitive pixels in the vertical direction are executed. Namely, while the timing control section sets the output signals of all of the plurality of clamping circuits and all of the plurality of integrating circuits to their initial levels each time by setting the all clamp instruction signal and the reset instruction signal to logical true levels, the data readout operations concerning the second and later photosensitive elements in the vertical direction are successively executed.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, configurations and effects of embodiments concerning the solid-state imaging apparatus in accordance with the present invention will be explained in detail with reference to FIGS. 1 to 7. Here, in the explanation of the drawings, constituents identical to each other will be referred to with marks identical to each other without their overlapping descriptions repeated.

Embodiment 1

Figure 1:
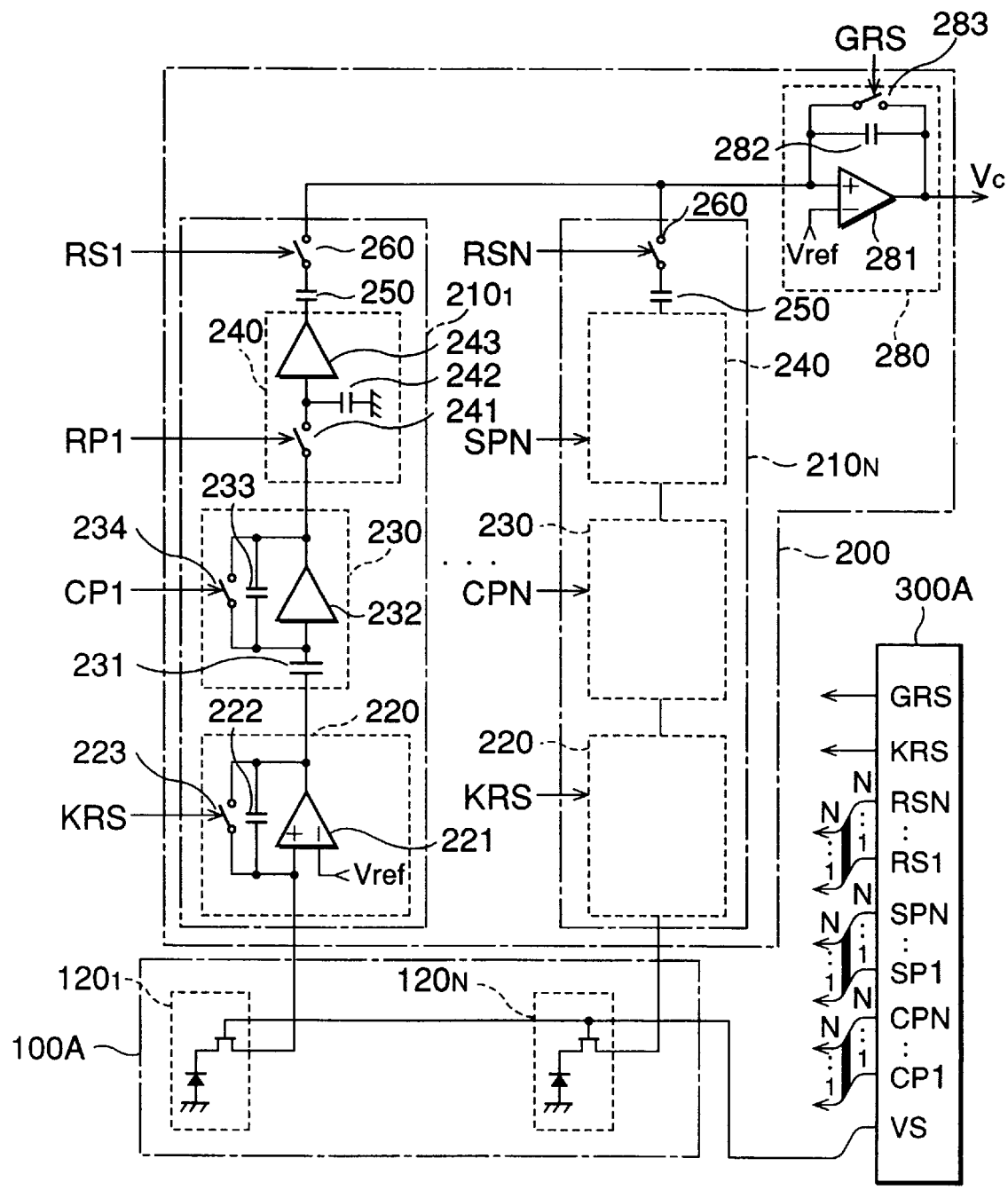
FIG. 1 is a circuit diagram showing the configuration of the solid-state imaging apparatus in Embodiment 1 in accordance with the present invention.

FIG. 1 is a configurational view of the solid-state imaging apparatus in this embodiment. As shown in FIG. 1, this apparatus comprises (a) a line type photosensitive section 100A in which, while N sets of photosensitive pixels $120_j$ (j=1 to N) each comprising a photodiode 130 for converting an input light signal into a current signal and a switch 140 which is connected to a signal output terminal of the photodiode 130 and outputs, in response to a read out signal VS, the current signals generated at the photodiodes 130 are arranged along one direction (refferred to "horizontal direction" hereinafter).

Also, this apparatus comprises (b) a signal processing section 200 having horizontal signal processing sections $210_j$ which respectively input the outputs from the photosensitive pixels $120_j$ and, after a signal processing, selectively output a signal in response to a horizontal scanning signal RSj and a data signal output circuit 280 which inputs the signal output from the horizontal signal processing sections $210_j$ and outputs an output data signal of the apparatus; and (c) a timing control section 300A for informing the photosensitive section 100A and the signal processing section 200 of instruction signals for operation timings.

Here, in the area type photosensitive section 100A, the photodiode 130 in each of the N pieces of photosensitive pixels $120_j$, while the switch 140 thereof is a MOS type transistor. Namely, the line type photosensitive section is preferably a MOS type image sensor whose charge transfer efficiency is better than that of CCD type image sensors or the like.

Each of the horizontal signal processing sections $210_j$ comprises (i) an integrating circuit 220 which inputs the output signal from the vertical photosensitive section $120_j$ and selectively subjects, in response to a reset instruction signal KRS, the current signal output from the vertical photosensitive section $120_j$ to an integrating or non-integrating operation with respect to a capacity element 222 connected between its input and output terminals; and (ii) a clamping circuit 230 which inputs a signal output from the integrating circuit 220 and selectively subjects, in response to a clamp instruction signal CPj, the input signal to a clamping processing or a non-clamping processing.

Further, each of the horizontal signal processing sections $210_j$ comprises (iii) a sample-and-hold circuit 240 which inputs a signal output from the clamping circuit 230 and selectively performs, in response to a sample instruction signal SPj, a sampling operation or a holding operation; (iv) a capacity element 250 which inputs a signal output from the sample-and-hold circuit 240 and outputs an AC component; and (v) a switch 260 which inputs a signals output from the capacity element 250 and opens and closes in response to the horizontal scanning signal RSj input from the timing control section 300A. Here, the data signal output circuit 280 inputs a signal by way of the switch 260 and outputs the output data signal of the apparatus.

The integrating circuit 220 comprises (i) an amplifier 221 which receives an output signal from the photosensitive pixel $120_j$ and amplifies the electric charge of thus input current signal; (ii) a capacity element 222 having one terminal connected to an input terminal of the amplifier 221 and the other terminal connected to an output terminal of the amplifier 221; and (iii) a switch 223 having one terminal connected to the input terminal of the amplifier 221 and the other terminal connected to the output terminal of the amplifier 221, which is turned on and off respectively when the reset instruction signal KRS input from the timing control section 300A is at a logical true level and a logical false level.

The integrating circuit 220 performs an integrating operation with respect to the input signal when the switch 223 is off, and sets the output signal to a predetermined initial level, as the non-integrating operation, when the switch 223 is on. Here, in the integrating circuit 220, the amplifier 221 is a differential operational amplifier having an inverting input terminal connected to the vertical photosensitive section $120_j$ and a non-inverting input terminal connected to a predetermined reference voltage source.

The clamping circuit 230 comprises (i) a capacity element 231 which inputs a signal output from the integrating circuit 220 and outputs an AC component; (ii) an amplifier 232 which inputs a signal by way of the capacity element 231, amplifies it, and then outputs thus amplified signal; (iii) a capacity element 233 having one terminal connected to an input terminal of the amplifier 232 and the other terminal connected to an output terminal of the amplifier 232; and (iv)

a switch 234 having one terminal connected to the input terminal of the amplifier 232 and the other terminal connected to the output terminal of the amplifier 232, which is turned on and off respectively when the clamp instruction signal CPj input from the timing control section 300A is at a logical true level and a logical false level.

The clamping circuit 230 performs a clamping processing with respect to the input signal when the switch 234 is off, and sets the output signal to a predetermined initial level, as the non-clamping operation, when the switch 234 is on.

The sample-and-hold circuit 240 comprises (i) a switch 241 which inputs a signal output from the clamping circuit 230 into one terminal and is turned off and on respectively when the sample instruction signal SPj is at a logical false level and a logical true level; (ii) a capacity element 242 for accumulating a signal charge by way of the switch 241; and (iii) a buffer amplifier 243 which inputs a voltage signal output from the other terminal of the switch 241, subjects it to impedance conversion, and outputs thus converted signal.

The sample-and-hold circuit 240 performs a sampling operation with respect to the input signal when the switch 241 is on and, when the switch 241 is off, holds the signal charge accumulated in the capacity element 242. Here, in the sample-and-hold circuit 240, a first terminal of the capacity element 242 is connected to the input terminal of the buffer amplifier 243, while a second terminal thereof is grounded.

The data signal output circuit 280 comprises (i) an amplifier 281 which outputs a signal output from the horizontal signal processing section $210_j$ and amplifies the electric charge of thus input current signal; (ii) a capacity element 282 having one terminal connected to an input terminal of the amplifier 281 and the other terminal connected to an output terminal of the amplifier 281; and (iii) a switch 283 having one terminal connected to the input terminal of the amplifier 281 and the other terminal connected to the output terminal of the amplifier 281, which is turned on and off respectively when the initial voltage setting instruction signal GRS input from the timing control section 300A is at a logical true level and a logical false level.

The data signal output circuit 280 amplifies the input signal when the switch 283 is off and sets the input terminal to a predetermined initial voltage when the switch 283 is on. Here, in the data signal output circuit 280, the amplifier 281 is a differential operational amplifier having an inverting input terminal connected to the switch 280 and a non-inverting input terminal connected to a predetermined reference voltage source.

Figure 2:
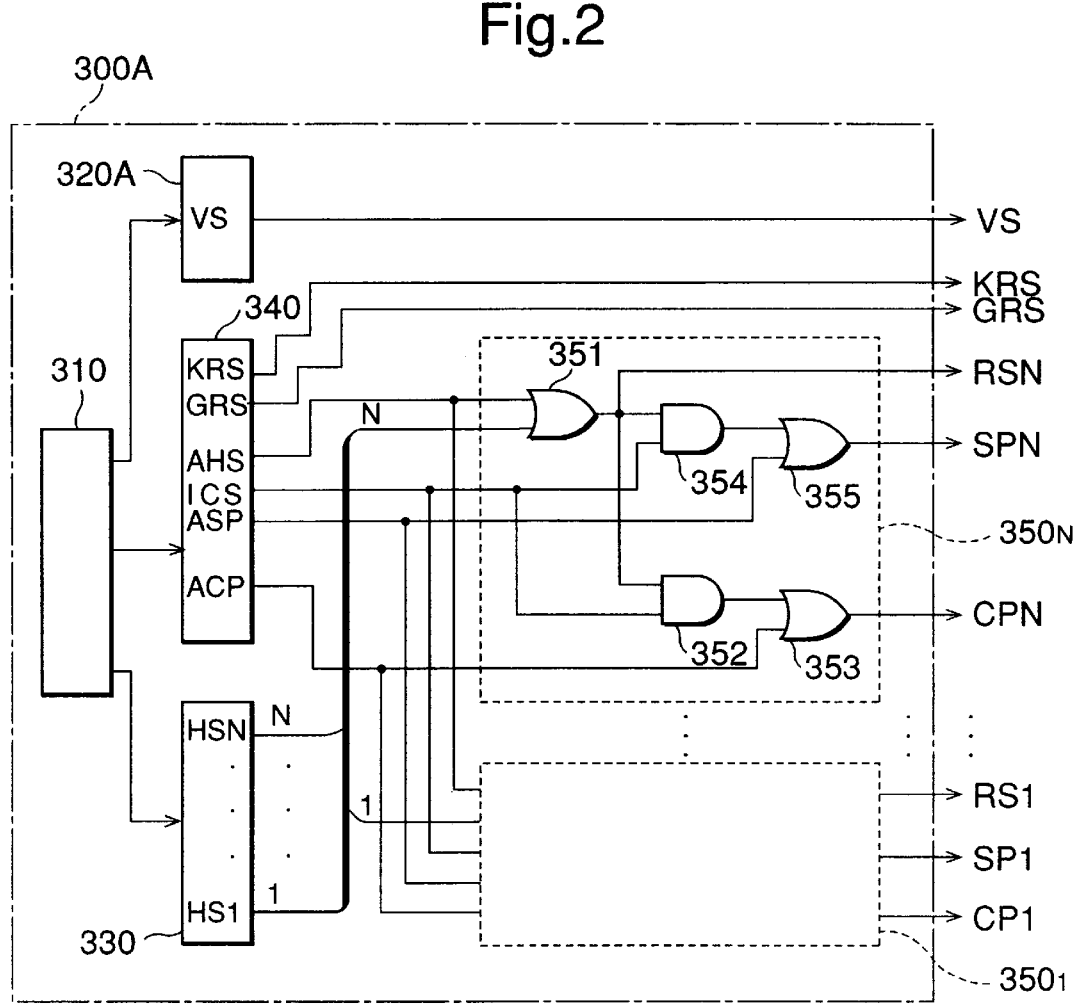
FIG. 2 is a circuit diagram showing the configuration of a timing control section in the solid-state imaging apparatus of FIG. 1.

FIG. 2 is a circuit diagram of the timing control section 300A. As shown in FIG. 2, the timing control section 300A comprises (i) a basic timing generator 310 for generating a basic timing for a data readout operation; (ii) a buffer driver 320A which outputs the read out signal VS in synchronization with the basic timing signal output from the basic timing generator 310; and (iii) a horizontal shift register 330 which outputs a horizontal selection instruction signal (individual line selection instruction signal) HSj in synchronization with the basic timing signal output from the basic timing generator 310.

Further, the timing control section 300A comprises (iv) a control signal generator 340 which generates the reset instruction signal KRS, the initial voltage setting instruction signal GRS, an all horizontal line selection instruction signal (all line selection instruction signal) AHS, an individual clamp/sample instruction signal ICS, an all sample instruction signal ASP, and an all clamp instruction signal ACP in synchronization with the basic timing signal output from the basic timing generator 310; and (v) secondary control signal generators $350j$ each of which inputs the all horizontal line selection instruction signal AHS, individual clamp/sample instruction signal ICS, all sample instruction signal ASP, all clamp instruction signal ACP, and horizontal selection instruction signal HSj and generates the horizontal scanning signal RSj, sample instruction signal SPj, and clamp instruction signal CPj.

Each of the secondary control signal generators $350j$ comprises an OR gate 351 which generates the horizontal scanning signal RSj by computing a logical sum of the all horizontal line selection instruction signal AHS for setting all of the vertical photosensitive sections $110_j$ to objects to be selected and the horizontal selection instruction signal HSj for setting only one vertical photosensitive section $110_j$ to an object to be selected; an AND gate 352 which computes a logical product of the individual clamp/sample instruction signal ICS for setting one clamping circuit 230 in the vertical photosensitive sections $110_j$ to an object to be selected and the horizontal scanning signal RSj input from the OR gate 351; and an OR gate 353 which generates the clamp instruction signal CPj by computing a logical sum of the all clamp instruction signal ACP for setting all of the clamping circuits 230 in the vertical photosensitive sections $110_j$ to objects to be selected and the signal output from the AND gate 352.

Further, each of the secondary control signal generators $350_j$ comprises an AND gate 354 which computes a logical product of the individual clamp/sample instruction signal ICS for setting one sample-and-hold circuit 240 in the photosensitive pixels $120_j$ to an object to be selected and the horizontal scanning signal RSj input from the OR gate 351; and an OR gate 355 which generates the sample instruction signal SPj by computing a logical sum of the all sample instruction signal ASP for setting all of the sample-and-hold circuits 240 in the photosensitive pixels $120_j$ to objects to be selected and the signal input from the AND gate 354.

Figure 3:
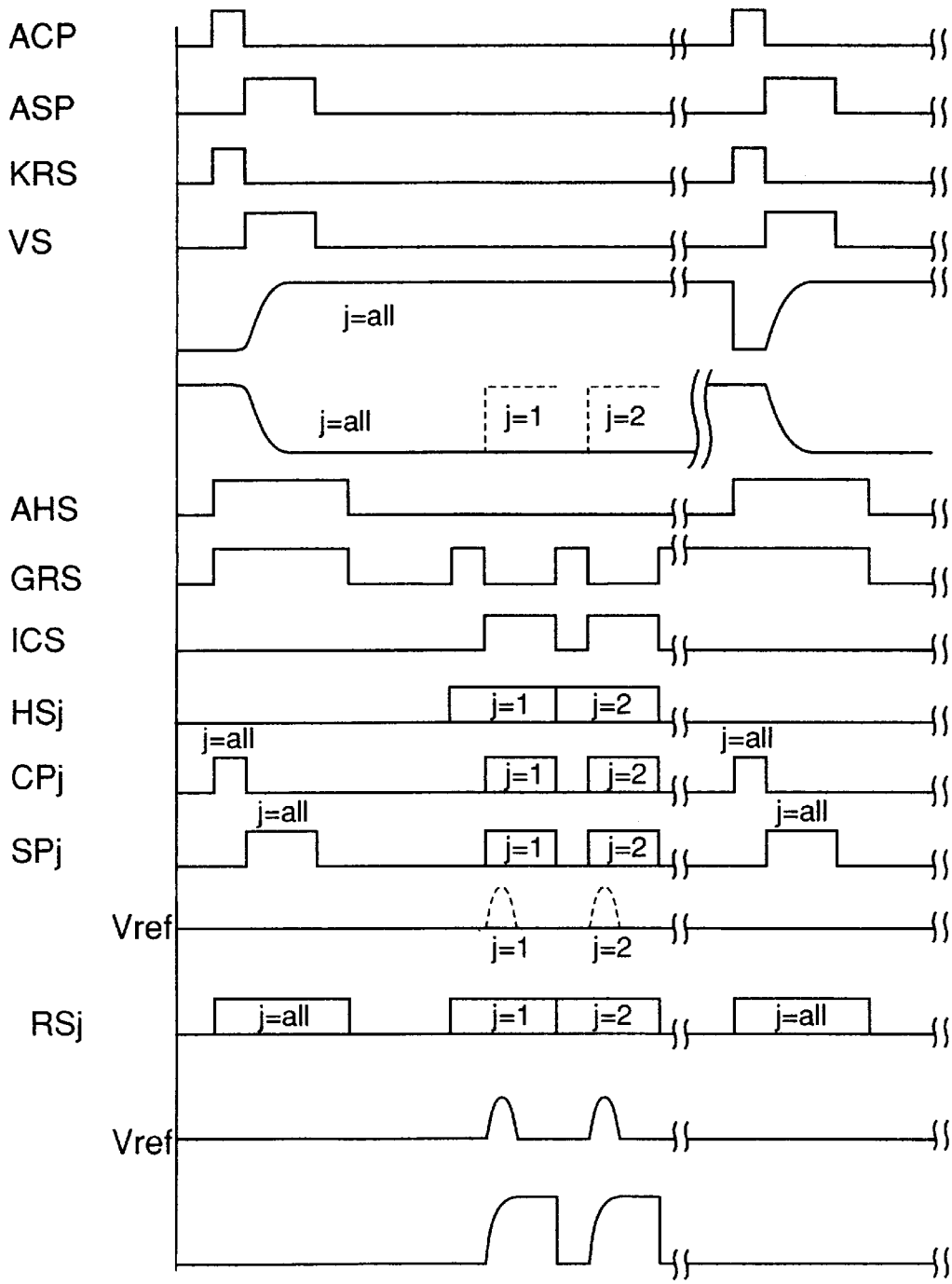
FIG. 3 is a timing chart for explaining operations of the solid-state imaging apparatus of FIG. 1.

In the following manner, the apparatus of this embodiment collects light image data input into the line type photosensitive section 100A. FIG. 3 is a timing chart for explaining operations of the apparatus in this embodiment.

In the solid-state imaging apparatus of this embodiment, a light image formed by light incident thereon from the outside is input into the line type photosensitive section 100A, and electric charges are accumulated in the respective photodiodes 130 of the area type photosensitive section 100 in response to the light intensities received thereby. After a predetermined detecting period, the electric charges accumulated in the respective photodiodes 130 are read out as shown in FIG. 3.

First, prior to the execution of a signal readout operation, the timing control section 300A sets the all clamp instruction signal ACP to a logical true level, thereby setting all of the clamp instruction signals CPj to a logical true level; and sets the integrating circuit reset instruction signal KRS to a logical true level, thereby setting the output terminal of the clamping circuit 230 and the output terminal of the integrating circuit 220 to a reference voltage $V_{ref}$ which is their initial voltage.

Also, before the signal readout operation is executed, the timing control section 300A sets the all horizontal line selection instruction signal AHS to a logical true level, thereby setting the horizontal scanning signals RSj corresponding to all the signal output lines to a logical true level, and sets the initial voltage setting instruction signal GRS to a logical true level. As a result, all the switches 260 are turned on, whereby the output terminals of all the capacity elements 250 are set to the reference voltage $V_{ref}$ which is the initial voltage of the data output circuit 280.

Next, the timing control section 300A sets the all clamp instruction signal ACP to a logical false level, thereby setting all of the claim instruction signals CPj to a logical false level. Also, it sets the integrating circuit reset instruction signal KRS to a logical false level. Further, while keeping the horizontal scanning signals RSj corresponding to all the signal output lines and the initial voltage setting instruction signal GRS at logical true levels, it sets a VS which turns on the switches 140 of the photosensitive pixels 120$_j$ to a logical true level, and sets the all sample instruction signal ASP to a logical true level, thereby setting the sample instruction signals SPj corresponding to all of the signal output lines to a logical true level.

Here, when the switch 140 is turned on, the electric charge accumulated in the photodiode 130 due to the light received thereby so far is turned into a current signal so as to be output from the line type photosensitive section 110$_j$. The output signal of the photosensitive pixel 120$_j$ is instantly accumulated by the integrating circuit 220 into the capacity element 222, which is a feedback capacity thereof, and then is output therefrom as a voltage. The signal output from the integrating circuit 220 is input into the capacity element 250 by way of the clamping circuit 230 and the sample-and-hold circuit 240. As a result, a voltage corresponding to the light intensity received in the photodiode 130 is applied to the signal input terminal of the capacity element 250. This voltage corresponding to the received light intensity is also applied to the first terminal of the capacity element 242 in the sample-and-hold circuit 240.

Next, the timing control section 300A sets the read out signal VS, which sets the photosensitive pixels 120$j$, to a logical false level and the all horizontal line selection instruction signal AHS to a logical false level, thereby setting the horizontal scanning signals RSj corresponding to all of the signal output lines to a logical false level; and sets the initial voltage setting instruction signal GRS to a logical false level. Thereafter, a data readout operation concerning the first photosensitive pixel 120$_1$ in the horizontal scanning operation with respect to the first photosensitive pixels 120$_j$ is started.

The timing control section 300A sets a horizontal selection instruction signal HS1 to a logical true level, thereby setting a horizontal scanning signal RS1, which instructs only the switch 260 corresponding to the first photosensitive pixel 120$_1$ in the horizontal direction to turn on, to a logical true level, by which only this switch 260 is turned on. At this moment, the timing control section 300 temporarily sets the initial voltage setting instruction signal GRS to a logical true level, thereby setting the voltage of the input terminal of the data output circuit 280 to the reference voltage V$_{ref}$.

Here, when the switch 260 corresponding to the first photosensitive pixel 120$_1$ in the horizontal direction is turned on so that the output terminal of the capacity element 250 and the input terminal of the data output circuit 280 are connected together, the voltage of the output terminal of the capacity element 250 is kept at that attained when the switch 260 was previously opened, i.e., reference voltage V$_{ref}$ which is the initial voltage of the input terminal of the data output circuit 280. Consequently, the voltage of the input terminal of the data output circuit 280 remains stable without fluctuation.

Next, the timing control section 300A sets the initial voltage setting signal GRS to a logical false level and, while keeping the horizontal scanning signal RS1, which sets the first photosensitive pixel 120$_{1,1}$ in the horizontal direction to an object to be selected, at a logical true level, sets a clamp instruction signal CP1 and a sample instruction signal SP1, which correspond to the first photosensitive pixel 120$_1$ in the horizontal direction, to logical true levels. As a result, the output terminal of the clamping circuit 230 changes to the reference voltage V$_{ref}$ which is the clamping voltage. By way of the sample-and-hold circuit 240, capacity element 250, and data output circuit 280, this change is output as an output data signal V$_o$ corresponding to the light intensity incident on the first photosensitive pixel 120$_1$ in the horizontal direction.

Subsequently, the timing control section 300A sets the horizontal scanning signal RS1, which instructs only the switch 260 corresponding to the first photosensitive pixel 120$_1$ in the horizontal direction to be selected, and the clamping instruction signal CP1 and sample instruction signal SP1 corresponding to the first photosensitive pixel 120$_1$ in the horizontal direction to logical false levels, thereby terminating the data readout operation concerning the first photosensitive pixel 120$_1$ in the horizontal direction.

Next, as with the first photosensitive pixel 120$_1$ in the horizontal direction, data readout operations concerning the second and later photosensitive pixels 120$_j$ in the horizontal direction are executed. Namely, while the timing control section 300A sets the voltage of the input terminal of the data signal output circuit 280 to the reference voltage V$_{ref}$ each time by setting one of horizontal scanning signals RS2 to RSN and the initial voltage setting signal to logical true levels, the data readout operations concerning the second to N-th photosensitive pixels 120$_2$ to 120$_N$ in the horizontal scanning operation with respect to the first photosensitive pixels 120$_j$ are successively executed.

Embodiment 2

Figure 4:
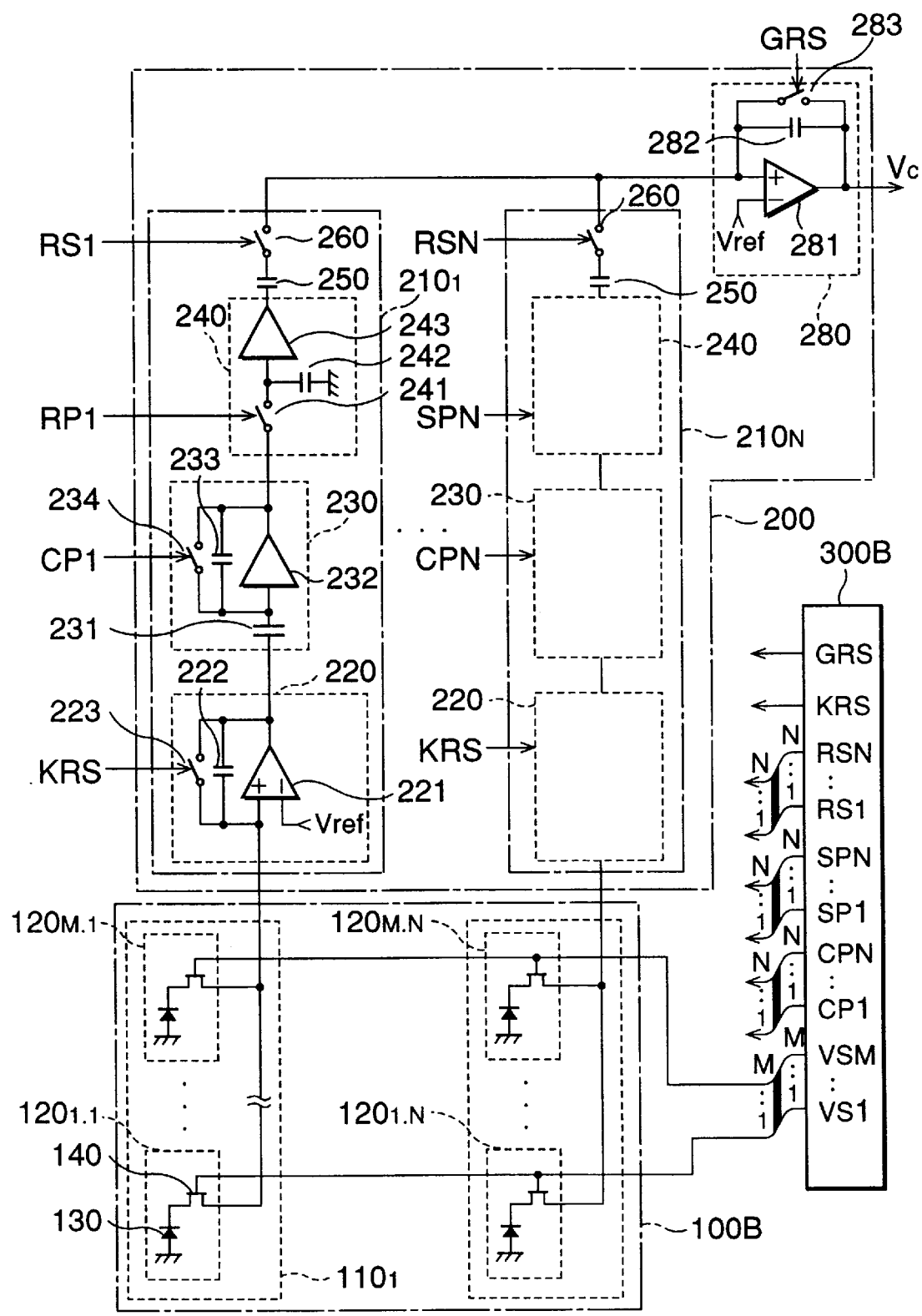
FIG. 4 is a circuit diagram showing the configuration of the solid-state imaging apparatus in Embodiment 2 in accordance with the present invention.

FIG. 4 is a configurational view of the solid-state imaging apparatus in this embodiment. As shown in FIG. 4, this apparatus comprises (a) an area type photosensitive section 100 in which, while M sets of photosensitive pixels 120$_{i,j}$ (i=1 to M; j=1 to N) each comprising a photodiode 130 for converting an input light signal into a current signal and a switch 140 which is connected to a signal output terminal of the photodiode 130 and outputs, in response to a vertical scanning signal VSi (i=1 to M), the current signal generated at the photodiode 130 are arranged along a first direction (referred to as "vertical direction" hereinafter), N pieces of vertical photosensitive sections 110 each having a common signal output terminal electrically connected to the signal output terminals of M pieces of the switches 140 are arranged along a second direction (referred to as "horizontal direction" hereinafter).

Also, this apparatus comprises (b) a signal processing section 200 having horizontal signal processing sections 210$_j$ which respectively input the outputs from the vertical photosensitive sections 110$_j$ (j=1 to N) and, after a signal processing, selectively output a signal in response to a horizontal scanning signal RSj and a data signal output circuit 280 which inputs the signal output from the horizontal signal processing sections 210$_j$ and outputs an output data signal of the apparatus; and (c) a timing control section 300B for informing the photosensitive section 100B and the signal processing section 200 of instruction signals for operation timings.

Here, in the area type photosensitive section 100B, the photodiode 130 in each of the M×N pieces of photosensitive pixels 120$_{i,j}$, while the switch 140 thereof is a MOS type transistor. Namely, the area type photosensitive section is preferably a MOS type image sensor whose charge transfer efficiency is better than that of CCD type image sensors or the like.

Each of the horizontal signal processing sections 210$_j$ comprises (i) an integrating circuit 220 which inputs the output signal from the vertical photosensitive section $110_j$ and selectively subjects, in response to a reset instruction signal KRS, the current signal output from the vertical photosensitive section $110_j$ to an integrating or non-integrating operation with respect to a capacity element 222 connected between its input and output terminals; and (ii) a clamping circuit 230 which inputs a signal output from the integrating circuit 220 and selectively subjects, in response to a clamp instruction signal CPj, the input signal to a clamping processing or a non-clamping processing.

Further, each of the horizontal signal processing sections $210_j$ comprises (iii) a sample-and-hold circuit 240 which inputs a signal output from the clamping circuit 230 and selectively performs, in response to a sample instruction signal SPj, a sampling operation or a holding operation; (iv) a capacity element 250 which inputs a signal output from the sample-and-hold circuit 240 and outputs an AC component; and (v) a switch 260 which inputs a signals output from the capacity element 250 and opens and closes in response to the horizontal scanning signal RSj input from the timing control section 300B. Here, the data signal output circuit 280 inputs a signal by way of the switch 260 and outputs the output data signal of the apparatus.

The integrating circuit 220 comprises (i) an amplifier 221 which inputs an output signal from the vertical photosensitive section $110_j$ and amplifies the electric charge of thus input current signal; (ii) a capacity element 222 having one terminal connected to an input terminal of the amplifier 221 and the other terminal connected to an output terminal of the amplifier 221; and (iii) a switch 223 having one terminal connected to the input terminal of the amplifier 221 and the other terminal connected to the output terminal of the amplifier 221, which is turned on and off respectively when the reset instruction signal KRS input from the timing control section 300B is at a logical true level and a logical false level.

The integrating circuit 220 performs an integrating operation with respect to the input signal when the switch 223 is off, and sets the output signal to a predetermined initial level, as the non-integrating operation, when the switch 223 is on. Here, in the integrating circuit 220, the amplifier 221 is a differential operational amplifier having an inverting input terminal connected to the vertical photosensitive section $110_j$ and a noninverting input terminal connected to a predetermined reference voltage source.

The clamping circuit 230 comprises (i) a capacity element 231 which inputs a signal output from the integrating circuit 220 and outputs an AC component; (ii) an amplifier 232 which inputs a signal by way of the capacity element 231, amplifies it, and then outputs thus amplified signal; (iii) a capacity element 233 having one terminal connected to an input terminal of the amplifier 232 and the other terminal connected to an output terminal of the amplifier 232; and (iv) a switch 234 having one terminal connected to the input terminal of the amplifier 232 and the other terminal connected to the output terminal of the amplifier 232, which is turned on and off respectively when the clamp instruction signal CPj input from the timing control section 300B is at a logical true level and a logical false level.

The clamping circuit 230 performs a clamping processing with respect to the input signal when the switch 234 is off, and sets the output signal to a predetermined initial level, as the non-clamping operation, when the switch 234 is on.

The sample-and-hold circuit 240 comprises (i) a switch 241 which inputs a signal output from the clamping circuit 230 into one terminal and is turned off and on respectively when the sample instruction signal SPj is at a logical false level and a logical true level; (ii) a capacity element 242 for accumulating a signal charge by way of the switch 241; and (iii) a buffer amplifier 243 which inputs a voltage signal output from the other terminal of the switch 241, subjects it to impedance conversion, and outputs thus converted signal.

The sample-and-hold circuit 240 performs a sampling operation with respect to the input signal when the switch 241 is on and, when the switch 241 is off, holds the signal charge accumulated in the capacity element 242. Here, in the sample-and-hold circuit 240, a first terminal of the capacity element 242 is connected to the input terminal of the buffer amplifier 243, while a second terminal thereof is grounded.

The data signal output circuit 280 comprises (i) an amplifier 281 which outputs a signal output from the horizontal signal processing section 210 and amplifies the electric charge of thus input current signal; (ii) a capacity element 282 having one terminal connected to an input terminal of the amplifier 281 and the other terminal connected to an output terminal of the amplifier 281; and (iii) a switch 283 having one terminal connected to the input terminal of the amplifier 281 and the other terminal connected to the output terminal of the amplifier 281, which is turned on and off respectively when the initial voltage setting instruction signal GRS input from the timing control section 300B is at a logical true level and a logical false level.

The data signal output circuit 280 amplifies the input signal when the switch 283 is off and sets the input terminal to a predetermined initial voltage when the switch 283 is on. Here, in the data signal output circuit 280, the amplifier 281 is a differential operational amplifier having an inverting input terminal connected to the switch 280 and a noninverting input terminal connected to a predetermined reference voltage source.

Figure 5:
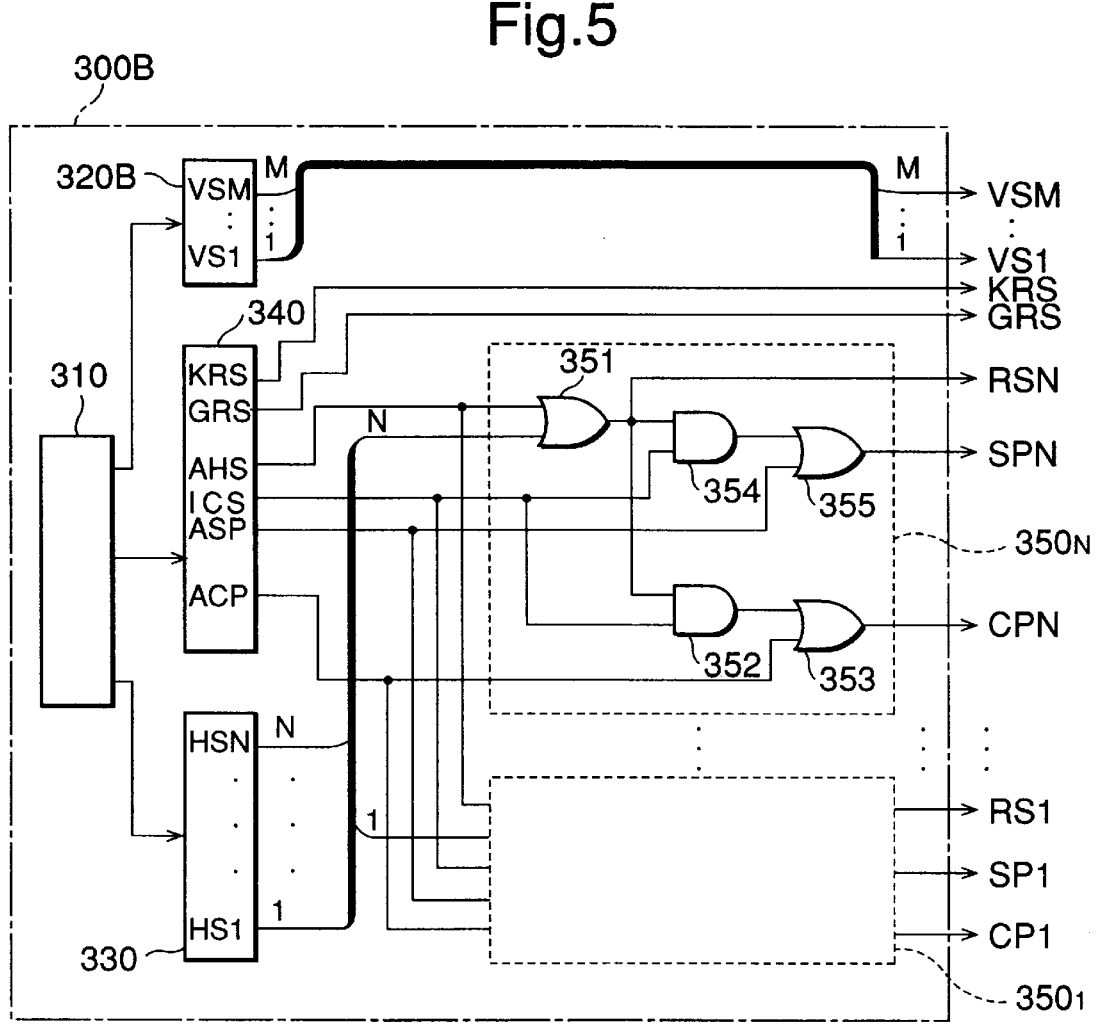
FIG. 5 is a circuit diagram showing the configuration of a timing control section in the solid-state imaging apparatus of FIG. 4.

FIG. 5 is a circuit diagram of the timing control section 300B. As shown in FIG. 5, the timing control section 300B comprises (i) a basic timing generator 310 for generating a basic timing for a data readout operation; (ii) a vertical shift register 320B which outputs the vertical scanning signal VSi (first scanning signal) in synchronization with the basic timing signal output from the basic timing generator 310; and (iii) a horizontal shift register 330 which outputs a horizontal selection instruction signal (individual line selection instruction signal) HSj in synchronization with the basic timing signal output from the basic timing generator 310.

Further, the timing control section 300B comprises (iv) a control signal generator 340 which generates the reset instruction signal KRS, the initial voltage setting instruction signal GRS, an all horizontal line selection instruction signal (all line selection instruction signal) AHS, an individual clamp/sample instruction signal ICS, an all sample instruction signal ASP, and an all clamp instruction signal ACP in synchronization with the basic timing signal output from the basic timing generator 310; and (v) secondary control signal generators $350_j$ each of which inputs the all horizontal line selection instruction signal AHS, individual clamp/sample instruction signal ICS, all sample instruction signal ASP, all clamp instruction signal ACP, and horizontal selection instruction signal HSj and generates the horizontal scanning signal (second scanning signal) RSj, sample instruction signal SPj, and clamp instruction signal CPj.

Each of the secondary control signal generators $350_j$ comprises an OR gate 351 which generates the horizontal scanning signal RSj by computing a logical sum of the all horizontal line selection instruction signal AHS for setting all of the vertical photosensitive sections $110_j$ to objects to be selected and the horizontal selection instruction signal HSj for setting only one vertical photosensitive section $110_j$ to an object to be selected; an AND gate 352 which computes a logical product of the individual clamp/sample instruction signal ICS for setting one clamping circuit 230 in the vertical photosensitive sections 110$_j$ to an object to be selected and the horizontal scanning signal RSj input from the OR gate 351; and an OR gate 353 which generates the clamp instruction signal CPj by computing a logical sum of the all clamp instruction signal ACP for setting all of the clamping circuits 230 in the vertical photosensitive sections 110$_j$ to objects to be selected and the signal output from the AND gate 352.

Further, each of the secondary control signal generators 350$_j$ comprises an AND gate 354 which computes a logical product of the individual clamp/sample instruction signal ICS for setting one sample-and-hold circuit 240 in the vertical photosensitive sections 110$_j$ to an object to be selected and the horizontal scanning signal RSj input from the OR gate 351; and an OR gate 355 which generates the sample instruction signal SPj by computing a logical sum of the all sample instruction signal ASP for setting all of the sample-and-hold circuits 240 in the vertical photosensitive sections 110$_j$ to objects to be selected and the signal input from the AND gate 354.

Figure 6:
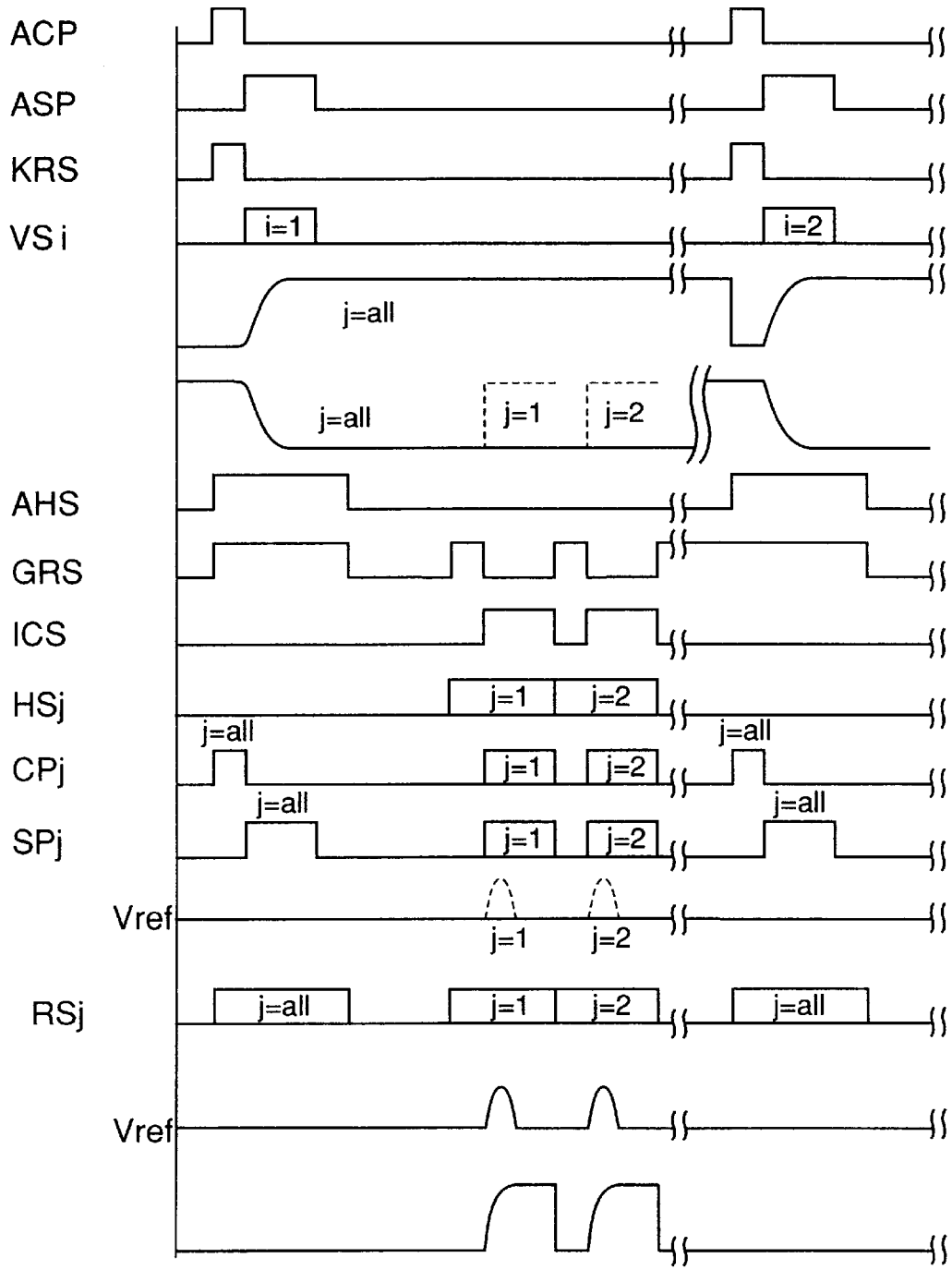
FIG. 6 is a timing chart for explaining operations of the solid-state imaging apparatus of FIG. 4.

In the following manner, the apparatus of this embodiment collects light image data input into the photosensitive section 110. FIG. 6 is a timing chart for explaining operations of the apparatus in this embodiment.

In the solid-state imaging apparatus of this embodiment, a light image formed by light incident thereon from the outside is input into the area type photosensitive section 100B, and electric charges are accumulated in the respective photodiodes 130 of the area type photosensitive section 100B in response to the light intensities received thereby. After a predetermined detecting period, the electric charges accumulated in the respective photodiodes 130 are read out as shown in FIG. 3.

First, prior to the execution of a signal readout operation, the timing control section 300B sets the all clamp instruction signal ACP to a logical true level, thereby setting all of the clamp instruction signals CPj to a logical true level; and sets the integrating circuit reset instruction signal KRS to a logical true level, thereby setting the output terminal of the clamping circuit 230 and the output terminal of the integrating circuit 220 to a reference voltage $V_{ref}$ which is their initial voltage.

Also, before the signal readout operation is executed, the timing control section 300B sets the all horizontal line selection instruction signal AHS to a logical true level, thereby setting the horizontal scanning signals RSj corresponding to all the signal output lines to a logical true level, and sets the initial voltage setting instruction signal GRS to a logical true level. As a result, all the switches 260 are turned on, whereby the output terminals of all the capacity elements 250 are set to the reference voltage $V_{ref}$ which is the initial voltage of the data output circuit 280.

Next, the timing control section 300B sets the all clamp instruction signal ACP to a logical false level, thereby setting all of the claim instruction signals CPj to a logical false level. Also, it sets the integrating circuit reset instruction signal KRS to a logical false level. Further, while keeping the horizontal scanning signals RSj corresponding to all the signal output lines and the initial voltage setting instruction signal GRS at logical true levels, it sets a VS1 which turns on only the switch 140 of the first photosensitive pixel 120$_{1,j}$ in the vertical scanning operation (first scanning operation) of all of the vertical photosensitive sections 110$_j$ to a logical true level, and sets the all sample instruction signal ASP to a logical true level, thereby setting the sample instruction signals SPj corresponding to all of the signal output lines to a logical true level.

Here, when the switch 140 is turned on, the electric charge accumulated in the photodiode 130 due to the light received thereby so far is turned into a current signal so as to be output from the line type photosensitive section 110$_j$. The output signal of the line type photosensitive section 110$_j$ is instantly accumulated by the integrating circuit 220 into the capacity element 222, which is a feedback capacity thereof, and then is output therefrom as a voltage. The signal output from the integrating circuit 220 is input into the capacity element 250 by way of the clamping circuit 230 and the sample-and-hold circuit 240. As a result, a voltage corresponding to the light intensity received in the photodiode 130 is applied to the signal input terminal of the capacity element 250. This voltage corresponding to the received light intensity is also applied to the first terminal of the capacity element 242 in the sample-and-hold circuit 240.

Next, the timing control section 300B sets the vertical scanning signal VS1, which sets the first photosensitive pixels 120$_{1,j}$ in the vertical direction to objects to be selected, to a logical false level and the all horizontal line selection instruction signal AHS to a logical false level, thereby setting the horizontal scanning signals RSj corresponding to all of the signal output lines to a logical false level; and sets the initial voltage setting instruction signal GRS to a logical false level. Thereafter, a data readout operation concerning the first photosensitive pixel 120$_{1,1}$ in the horizontal scanning operation (second scanning operation) with respect to the first photosensitive pixels 120$_{1,j}$ in the vertical direction is started.

The timing control section 300B sets a horizontal selection instruction signal HS1 to a logical true level, thereby setting a horizontal scanning signal RS1, which instructs only the switch 260 corresponding to the first photosensitive pixel 120$_{1,1}$ in the horizontal direction to turn on, to a logical true level, by which only this switch 260 is turned on. At this moment, the timing control section 300B temporarily sets the initial voltage setting instruction signal GRS to a logical true level, thereby setting the voltage of the input terminal of the data output circuit 280 to the reference voltage $V_{ref}$.

Here, when the switch 260 corresponding to the first photosensitive pixel 120$_{1,1}$ in the horizontal direction is turned on so that the output terminal of the capacity element 250 and the input terminal of the data output circuit 280 are connected together, the voltage of the output terminal of the capacity element 250 is kept at that attained when the switch 260 was previously opened, i.e., reference voltage $V_{ref}$ which is the initial voltage of the input terminal of the data output circuit 280. Consequently, the voltage of the input terminal of the data output circuit 280 remains stable without fluctuation.

Next, the timing control section 300B sets the initial voltage setting signal GRS to a logical false level and, while keeping the horizontal scanning signal RS1, which sets the first photosensitive pixel 120$_{1,1}$ in the horizontal direction to an object to be selected, at a logical true level, sets a clamp instruction signal CP1 and a sample instruction signal SP1, which correspond to the first photosensitive pixel 120$_{1,1}$ in the horizontal direction, to logical true levels. As a result, the output terminal of the clamping circuit 230 changes to the reference voltage $V_{ref}$ which is the clamping voltage. By way of the sample-and-hold circuit 240, capacity element 250, and data output circuit 280, this change is output as an output data signal $V_o$ corresponding to the light intensity incident on the first photosensitive pixel 1201$_{1,1}$ in the horizontal direction.

Subsequently, the timing control section 300B sets the horizontal scanning signal RS1, which instructs only the switch 260 corresponding to the first photosensitive pixel $120_{1,1}$ in the horizontal direction to be selected, and the clamping instruction signal CP1 and sample instruction signal SP1 corresponding to the first photosensitive pixel $120_{1,1}$ in the horizontal direction to logical false levels, thereby terminating the data readout operation concerning the first photosensitive pixel $120_{1,1}$ in the horizontal direction.

Next, as with the first photosensitive pixel $120_{1,1}$ in the horizontal direction, data readout operations concerning the second and later photosensitive pixels $120_{1,j}$ in the horizontal direction are executed. Namely, while the timing control section 300B sets the voltage of the input terminal of the data signal output circuit 280 to the reference voltage $V_{ref}$ each time by setting one of horizontal scanning signals RS2 to RSN and the initial voltage setting signal to logical true levels, the data readout operations concerning the second to N-th photosensitive pixels $120_{1,2}$ to $120_{1,N}$ in the horizontal scanning operation with respect to the first photosensitive pixels $120_{1,j}$ in the vertical direction are successively executed.

Then, as with the first photosensitive pixels $120_{1,j}$ in the vertical direction, data readout operations concerning the second and later photosensitive pixels $120_{i,j}$ in the vertical direction are executed. Namely, while the timing control section 300B sets the voltage of the output terminal of the clamping circuit 230 and the output terminal of the integrating circuit 220 to the reference voltage $V_{ref}$ each time by setting the all clamp instruction signal ACP and the integrating circuit reset instruction signal KRS to logical true levels, the data readout operations concerning the second to M-th photosensitive pixels $120_{2,j}$ to $120_{M,j}$ in the vertical scanning operation of the vertical photosensitive sections $110_j$ are successively executed.

Thus, the light image formed by light input into the area type photosensitive section 100B can be captured, whereby imaging data can be obtained.

Embodiment 3

Figure 7:
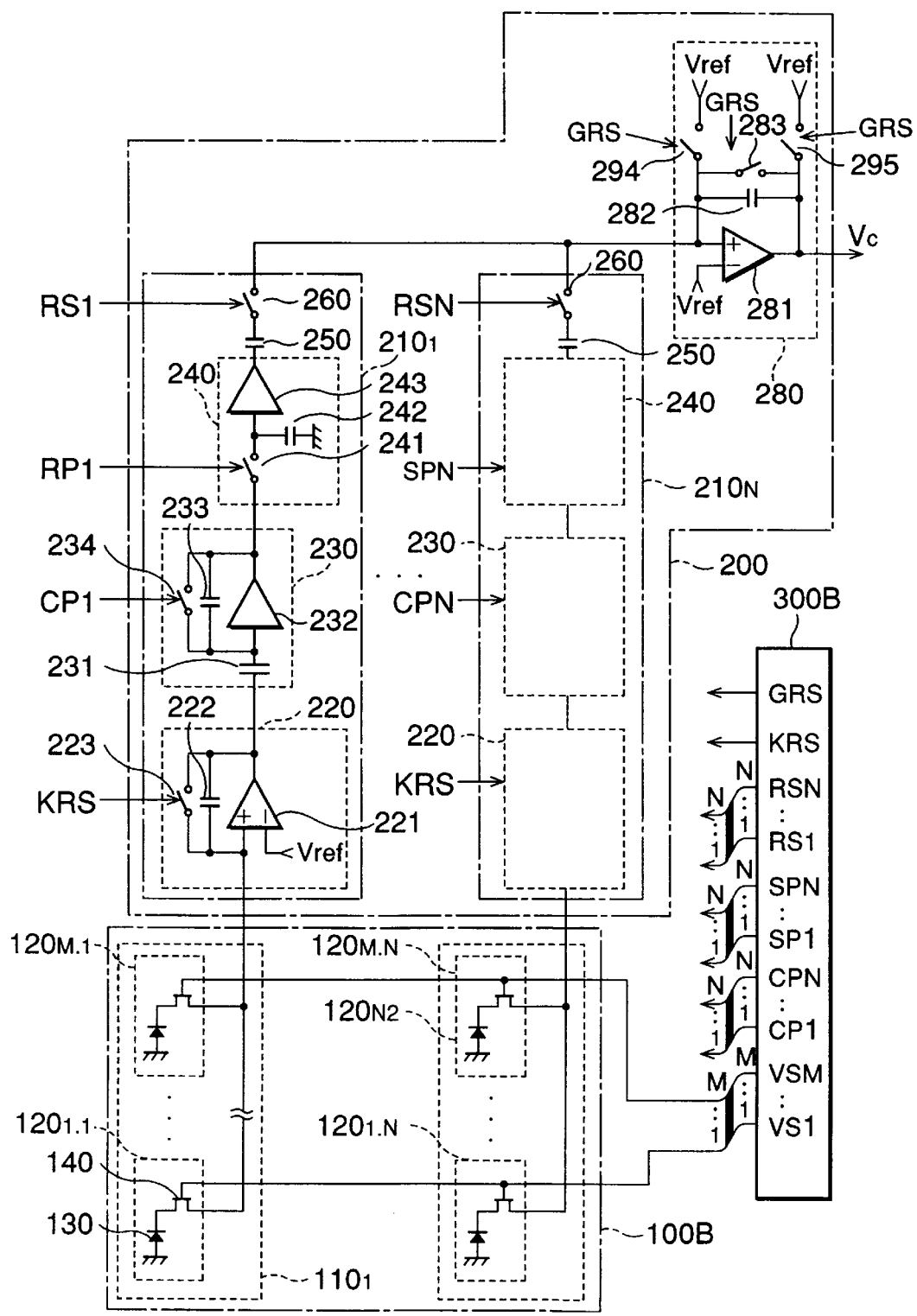
FIG. 7 is a circuit diagram showing the configuration of the solid-state imaging apparatus in Embodiment 3 in accordance with the present invention.

FIG. 7 is a configurational view of the solid-state imaging apparatus in Embodiment 2 of the present invention. As shown in FIG. 7, the apparatus of this embodiment differs from that of Embodiment 2 only in that, as compared with the data output circuit 280, a data output circuit 290 further comprises (i) a switch 294 which has a first terminal connected to the input terminal of the amplifier 281 and a second terminal set to the reference voltage $V_{ref}$ and is closed during a period in which the initial voltage setting instruction signal GRS is at a logical true level; and (ii) a switch 295 which has a first terminal connected to the output terminal of the amplifier 281 and a second terminal set to the reference voltage $V_{ref}$ and is closed during a period in which the initial voltage setting instruction signal GRS is at the logical true level.

While the apparatus of this embodiment operates at a timing similar to that of the apparatus of Embodiment 2, when the initial voltage setting instruction signal GRS is set to a logical true level, not only the input and output terminals are set to the reference voltage $V_{ref}$ due to an imaginary short-circuit between the switch 283 and the amplifier 281 but also the input and output terminals are forcibly set to the reference voltage $V_{ref}$ by way of the switch 294 and the switch 295. Consequently, the input and output terminals of the data output circuit 290 are rapidly set to the reference voltage $V_{ref}$ when the initial voltage setting instruction signal GRS is set to a logical true level, whereby imaging accuracy can further be improved.

Without being restricted to the foregoing embodiments, the present invention can be modified in various manners. For example, in the foregoing embodiments, the area type photosensitive section is constituted by a plurality of line type photosensitive sections in order to photoelectrically convert a two-dimensional optical image incident thereon from the outside. Nevertheless, the whole photosensitive section may be constituted by one piece of a line type photosensitive section in order to photoelectrically convert a one-dimensional optical image incident thereon from the outside. In this case, the horizontal signal processing section is constituted by only one set of a circuit in which an integrating circuit, a clamping circuit, a sample-and-hold circuit, a capacity element, a switch, and a data signal output circuit are successively connected to each other in series.

After the received light signal is read out into a capacity element from one photosensitive pixel selected from the plurality of photosensitive pixels constituting the line type photosensitive section in the first scanning operation, the timing control section may not temporarily set the initial voltage setting instruction signal to a logical true level when the received light signal is read out from the capacity element to the data signal output circuit in the second scanning operation. It is due to the fact that the input terminal of the data signal output circuit has been set and stably held at the reference voltage, which is the initial voltage, over a period extending from the initial voltage setting prior to the starting of the first scanning operation till the starting of the second scanning operation. Therefore, operations for setting the initial voltage with respect to the input terminal of the data signal output circuit can be reduced.

As explained in detail in the foregoing, the solid-state imaging apparatus of the present invention is configured such that the input terminal of the data output circuit does not fluctuate when each photodiode is selected in order to read out the signals corresponding to the light intensities received in the photodiode, whereby imaging can be performed with a high accuracy in a high speed. Accordingly, the solid-state imaging apparatus of the present invention can read out output data in a high speed while favorably maintaining a linear characteristic in the relationship between incident light intensity and output signal, and can read out output data of a plurality of photosensitive pixels as being added together, whereby a two-dimensional X-ray image sensor having a large area suitable for medical use and the like can be realized.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 079087/1996 filed on Apr. 1, 1996 is hereby incorporated by reference.

What is claimed is:

1. A solid-state imaging apparatus for capturing a one-dimensional optical image, said apparatus comprising:

a line type photosensitive section comprising a plurality of photosensitive pixels, said photosensitive pixels being arranged along a predetermined direction, each of said photosensitive pixels converting an input light signal into a current signal and outputting the current signal;

integrating circuits arranged for said photosensitive pixels respectively, each of said integrating circuits selectively performing an integrating operation for the current signal output from the corresponding photosensitive pixel and an initial voltage level setting operation for an output signal;

clamping circuits arranged for said integrating circuit respectively, each of the clamping circuits selectively performing a clamping processing for a signal output from the corresponding integrating circuit and an initial voltage level setting operation for an output signal;

sample-and-hold circuits arranged for said clamping circuits respectively, each of said sample-and-hold circuits selectively performing a sampling and holding operation for a signal output from the corresponding clamping circuit;

first capacity elements arranged for said sample-and-hold circuits respectively, each of said first capacity elements outputting an AC component based on a signal output from the corresponding sample-and-hold circuit;

first switches arranged for said first capacity elements respectively, each of said first switches controlling an output of said first capacity element;

a data signal output circuit for performing an output operation of an output data signal based on a signal input from one of said first switches and setting an initial-voltage setting operation for an input terminal selectively; and a timing control section for controlling operation timings of said plurality of photosensitive pixels, said integrating circuits, said clamping circuits, said sample-and-hold circuits, said first switches, and said data signal output circuit, wherein said timing control section instructs:

said integrating circuits and said clamping circuits to perform the initial voltage level setting operation about the output terminals of said integrating circuits before the current signals are read out from said plurality of photosensitive pixels;

said first switches and said data signal output circuit to perform the initial voltage level setting operation about the output terminals of said first capacity elements and the input terminals of said data signal output circuit over a period extending from a time before the current signals are read out from the plurality of photosensitive pixels till a time at which said signal is being read out;

said integrating circuits to perform the integrating operation;

said clamping circuits to perform the clamping processing;

said sample-and-hold circuits to perform the sampling operation during a period in which the current signal is being read out from said plurality of photosensitive pixels; and said clamping circuits to perform the initial voltage level setting operation, said sample-and-hold circuits to perform the sampling operation, said first capacity element to perform the output operation, and said data signal output circuit to perform the output operation during a period in which a signal is read out from said first capacity element after the current signals are read out from said plurality of photosensitive pixels.

2. An apparatus according to claim 1, wherein said data signal output circuit comprises:

an amplifier for amplifying a signal input from said first capacity element;

a second capacity element having a first terminal connected to an input terminal of said amplifier and a second terminal connected to an output terminal of said amplifier; and a second switch having a first terminal connected to an input terminal of said amplifier and a second terminal connected to an output terminal of said amplifier, said second switch performing opening and closing operations in response to an initial voltage setting instruction signal input from said timing control section.

3. An apparatus according to claim 2, wherein said data signal output circuit further comprises:

a third switch having a first terminal connected to a first terminal of said second capacity element and a second terminal connected to a predetermined reference voltage source, said third switch performing, in response to said initial voltage setting instruction signal, opening and closing operations identical to those of said second switch; and a fourth switch having a first terminal connected to a second terminal of said second capacity element and a second terminal connected to a predetermined reference voltage source, said fourth switch performing, in response to said initial voltage setting instruction signal, opening and closing operations identical to those of said second switch and third switch.

4. An apparatus according to claim 1, wherein each of said plurality of photosensitive pixels comprises:

a photodiode for converting said input light signal into a current signal; and a second switch having a first terminal connected to an output terminal of said photodiode and a second terminal connected to a common signal line in said line type photosensitive section, said second switch performing opening and closing operations in response to one input signal among a plurality of scanning signals output from said timing control section.

5. An apparatus according to claim 1, wherein said integrating circuit comprises:

an amplifier for amplifying a signal output from the corresponding photosensitive pixel;

a second capacity element having a first terminal connected to an input terminal of said amplifier and a second terminal connected to an output terminal of said amplifier; and a second switch having a first terminal connected to the input terminal of said amplifier and a second terminal connected to the output terminal of said amplifier, said second switch performing opening and closing operations in response to a reset instruction signal output from said timing control section.

6. An apparatus according to claim 1, wherein said clamping circuit comprises:

a second capacity element having an input terminal connected to an output terminal of the corresponding integrating circuit;

an amplifier having an input terminal connected to an output terminal of said second capacity element, said amplifier amplifying a signal input from said second capacity element;

a third capacity element having a first terminal connected to an input terminal of said amplifier and a second terminal connected to an output terminal of said amplifier; and a second switch having a first terminal connected to the input terminal of said amplifier and a second terminal connected to the output terminal of said amplifier, said second switch performing opening and closing operations in response to a corresponding clamp instruction signal output from said timing control section.

7. An apparatus according to claim 1, wherein said sample-and-hold circuit comprises:
- a second switch having a first terminal connected to an output terminal of the corresponding clamping circuit, said second switch performing opening and closing operations in response to a corresponding sample instruction signal output from said timing control section;
- a second capacity element having a first terminal connected to a second terminal of said second switch and a second terminal connected to a predetermined voltage source; and
- a buffer amplifier having an input terminal connected to the second terminal of said second switch, said buffer amplifier subjecting a signal output from said second switch to an impedance conversion.

8. An apparatus according to claim 1, wherein said first capacity element has an input terminal connected to an output terminal of the corresponding sample-and-hold circuit and an input terminal of said first switch, and said first switch has an output terminal connected to the input terminal of said data signal output circuit, and performs opening and closing operations in response to a corresponding scanning signal output from said timing control section.

9. An apparatus according to claim 1, wherein said timing control section outputs:
- a read out signal for instructing said plurality of photosensitive pixels to output the current signals,
- a reset instruction signal for instructing said integrating circuits to selectively perform the integrating operation and the initial voltage level setting operation,
- clamp instruction signals for instructing said clamping circuits to selectively perform the clamping processing and the initial voltage level setting operation,
- sample instruction signals for instructing said sample-and-hold circuits to selectively perform the sampling and holding operations,
- scanning signals for instructing said first switches to selectively control the output of said first capacity elements and set the initial voltage of said first capacity elements, and
- an initial voltage setting instruction signal for instructing said data signal output circuit to selectively perform the output operation and the initial voltage setting operation.

10. An apparatus according to claim 9, wherein said timing control section computes:
- a logical sum of an all line selecting instruction signal for setting all of said line type photosensitive pixels to objects to be selected and a plurality of individual line selection instruction signals for respectively setting said line type photosensitive pixels to objects to be selected, so as to generate said scanning signals;
- a logical sum of a result obtained when a logical product of individual clamp instruction signals for respectively setting said clamping circuits to objects to be selected and said scanning signals is computed and an all clamp instruction signal for setting all of said clamping circuits to objects to be selected, so as to generate said clamp instruction signals; and
- a logical sum of a result obtained when a logical product of individual sample instruction signals for respectively setting said sample-and-hold circuits to objects to be selected and said scanning signals is computed and an all sample instruction signal for setting all of said sample-and-hold circuits to objects to be selected, so as to generate said sample instruction signals, and wherein said timing control section sets:
- said reset instruction signal and clamp instruction signals to logical true levels before the read out signal is set to a logical true level;
- all of said scanning signals and initial voltage level setting instruction signal to logical true levels during a period extending from a time the read out signal is set to a logical true level till a time at which said signal is at the logical true level;
- all of said sample instructions signal to a logical true level while said reset instruction signal is kept at a logical false level during a period in which the read out signal is at the logical true level; and
- one of said clamp instruction signals corresponding to one signal selected from said scanning signals and one of sample instruction signals corresponding to one signal selected from said scanning signals to logical true levels during a period in which said scanning signal is set to the logical true level again after the read out signal is reset to the logical false level again.

11. A solid-state imaging apparatus for capturing a two-dimensional optical image, said apparatus comprising:
- an area type photosensitive section having a first number of line type photosensitive sections arranged along a first direction and common signal lines arranged for said line type photosensitive sections, each of said line type photosensitive sections having a second number of photosensitive pixels arranged along a second direction, each of said photosensitive pixels converting an input light signal into a current signal, each of said photosensitive pixels in said line type photosensitive sections outputting the current signal to the corresponding common signal line;
- integrating circuits arranged for said line type photosensitive sections respectively, each of said integrating circuits selectively performing an integrating operation for a signal output from the corresponding line type photosensitive section and an initial voltage level setting operation for an output signal;
- clamping circuits arranged for said integrating circuits respectively, each of said clamping circuits selectively performing a clamping processing for a signal output from the corresponding integrating circuit and an initial voltage level setting operation for an output signal;
- sample-and-hold circuits arranged for said clamping circuits respectively, each of sample-and-hold circuits selectively performing sampling and holding operations for a signal output from the corresponding clamping circuit;
- first capacity elements arranged for said sample-and-hold circuits respectively, each of first capacity elements performing an output processing of an AC component based on a signal output from the corresponding sample-and-hold circuit;
- first switches arranged for said first capacity elements respectivly, each of said switches controlling an output of the corresponding first capacity element;
- a data signal output circuit for selectively performing an output processing of respective output data signal based on a signal output from one of said first switches and an initial-voltage setting operation for an input terminal; and a timing control section for controlling operation timings of said photosensitive pixels, said integrating circuits, said clamping circuits, said sample-and-hold circuits, said first switches, and said data signal output circuit, wherein said timing control section instructs:

said integrating circuits and clamping circuits to perform the initial voltage level setting operation before a signal is read out from one photosensitive pixel selected from said photosensitive pixels in each of said line type photosensitive sections;

said first switches and said data signal output circuit to perform the initial voltage setting operation about the output terminals of said first capacity elements and the input terminal of said data signal output circuit over a period extending from a time before the signal is read out from one photosensitive pixel selected from the photosensitive pixels in each of said line type photosensitive sections till a time at which said signal is being read out;

said integrating circuits to perform the integrating operation;

said clamping circuits to perform the clamping processing;

said sample-and-hold circuits to perform the sampling operation during a period in which the signal is being read out from one photosensitive pixel selected from the photosensitive pixels in each of said line type photosensitive sections;

said data signal output circuit to perform the initial voltage setting operation about the input terminal of said data signal output circuit during a period in which a signal is being read out from one of said first capacity elements corresponding to one line type photosensitive section selected from said line type photosensitive sections after the signal is read out from one photosensitive pixel selected from the line type photosensitive pixels in each of said line type photosensitive sections; and one of said clamping circuits corresponding to one line type photosensitive section selected from said line type photosensitive sections to perform the initial voltage level setting operation;

one of said sample-and-hold circuits corresponding to one line type photosensitive section selected from said line type photosensitive sections to perform the sampling operation;

one of said first capacity elements corresponding to one line type photosensitive section selected from said line type receiving sections to perform the output processing; and said data signal output circuit to perform the output processing.

12. An apparatus according to claim 11, wherein said data signal output circuit comprises:

an amplifier for amplifying each signal input from said plurality of first capacity elements;

a second capacity element having a first terminal connected to an input terminal of said amplifier and a second terminal connected to an output terminal of said amplifier; and a second switch having a first terminal connected to the input terminal of said amplifier and a second terminal connected to the output terminal of said amplifier, said second switch performing opening and closing operations in response to an initial voltage setting operation signal input from said timing control section.

13. An apparatus according to claim 12, wherein said data signal output circuit further comprises:

a third switch having a first terminal connected to a first terminal of said second capacity element and a second terminal connected to a predetermined reference voltage source, said third switch performing, in response to said initial voltage setting operation signal, opening and closing operations identical to those of said second switch; and a fourth switch having a first terminal connected to a second terminal of said second capacity element and a second terminal connected to a predetermined reference voltage source, the fourth switch performing, in response to said initial voltage setting operation signal, opening and closing operations identical to those of said second switch and third switch.

14. An apparatus according to claim 11, wherein each of said photosensitive pixels comprises:

a photodiode for converting said input light signal into a current signal; and a second switch having a first terminal connected to an output terminal of said photodiode and a second terminal connected to one of a plurality of common signal lines in said number of line type photosensitive sections, said second switch performing opening and closing operations in response to one input signal among a plurality of first scanning signals output from said timing control section.

15. An apparatus according to claim 11, wherein each of said integrating circuits comprises:

an amplifier for amplifying a signal output from the corresponding line type photosensitive section;

a second capacity element having a first terminal connected to an input terminal of said amplifier and a second terminal connected to an output terminal of said amplifier; and a second switch having a first terminal connected to the input terminal of said amplifier and a second terminal connected to the output terminal of said amplifier, said second switch performing opening and closing operations in response to a reset instruction signal output from said timing control section.

16. An apparatus according to claim 11, wherein each of said clamping circuits comprises:

a second capacity element having an input terminal connected to an output terminal of the corresponding integrating circuit;

an amplifier having an input terminal connected to an output terminal of said second capacity element and amplifies a signal output from said second capacity element;

a third capacity element having a first terminal connected to the input terminal of said amplifier and a second terminal connected to an output terminal of said amplifier; and a second switch having a first terminal connected to the input terminal of said amplifier and a second terminal connected to the output terminal of said amplifier, said second switch performing opening and closing operations in response to one input clamp instruction signal among a clamp instruction signals output from said timing control section.

17. An apparatus according to claim 11, wherein each of said sample-and-hold circuits comprises:

a second switch having a first terminal connected to an output terminal of the corresponding clamping circuit, said second switching opening and closing operations in response to one input sample instruction signal among a plurality of sample instruction signals output from said timing control section;

a second capacity element having a first terminal connected to a second terminal of said second switch and a second terminal connected to a predetermined voltage source; and a buffer amplifier having an input terminal connected to the second terminal of said second switch, said buffer amplifier subjecting a signal input from said second switch to an impedance conversion.

18. An apparatus according to claim 11, wherein each of said first capacity elements has an input terminal connected to an output terminal of the corresponding said sample-and-hold circuit and an output terminal connected to an input terminal of the corresponding first switch, and each of said first switches has an output terminal connected to the input terminal of said data signal output circuit, said first switch performing opening and closing operations in response to one input signal among a plurality of second scanning signals output from said timing control section.

19. An apparatus according to claim 11, wherein said timing control section outputs:

first scanning signals for individually instructing said photosensitive pixels to perform the output processing which is common among said line type photosensitive sections, a reset instruction signal for instructing said integrating circuits to selectively perform the integrating operation and the initial voltage level setting operation;

a plurality of clamp instruction signals for individually instructing said clamping circuits to selectively perform the clamping processing and the initial voltage level setting operation;

sample instruction signals for individually instructing said sample-and-hold circuits to selectively perform sampling and holding operations, second scanning signals for individually instructing said first switches to selectively control the outputs of said first capacity elements and set the initial voltage level of first capacity elements, and an initial voltage setting instruction signal for instructing said data signal output circuit to selectively perform the output operation and the initial voltage setting operation.

20. An apparatus according to claim 19, wherein said timing control section computes:

a logical sum of an all line selecting instruction signal for setting all of said line type photosensitive sections to objects to be selected and a plurality of individual line selection instruction signals for respectively setting said line type photosensitive sections to objects to be selected, so as to generate said second scanning signals;

a logical sum of a result obtained when a logical product of individual clamp instruction signals for respectively setting said clamping circuits to objects to be selected and said second scanning signals is computed and an all clamp instruction signal for setting all of said clamping circuits to objects to be selected, so as to generate said clamp instruction signals; and a logical sum of a result obtained when a logical product of individual sample instruction signals for respectively setting said sample-and-hold circuits to objects to be selected and said second scanning signals is computed and an all sample instruction signal for setting all of said sample-and-hold circuits to objects to be selected, so as to generate said sample instruction signals, and wherein said timing control section sets:

said reset instruction signal and all of said clamp instruction signals to logical true levels before one signal selected from said first scanning signals is set to a logical true level;

all of said second scanning signals and said initial potential setting instruction signal to logical true levels during a period extending from a time before one signal selected from said first scanning signals is set to a logical true level till a time at which said signal is at the logical true level;

all of said sample instruction signals to logical true levels while said reset instruction signal is kept at a logical false level during a period in which one signal selected from said first scanning signals is at the logical true level;

said initial potential setting instruction signal to a logical true level during a period in which one of said second scanning signals is reset to the logical true level after one signal selected from said first scanning signals is reset to the logical false level; and one of said clamp instruction signals corresponding to one signal selected from said second scanning signals and one of said sample instruction signals corresponding to one signal selected from said second scanning signals to logical true levels.

* * * * *